(12) United States Patent
Al-Husseini et al.

(10) Patent No.: US 12,136,277 B2
(45) Date of Patent: Nov. 5, 2024

(54) COLLECTION, PROCESSING, AND OUTPUT OF FLIGHT INFORMATION METHOD, SYSTEM, AND APPARATUS

(71) Applicant: Aura Training Systems, Inc., Waialua, HI (US)

(72) Inventors: Mahdi Al-Husseini, Waialua, HI (US); Joshua Barnett, Stanford, CA (US); Anthony Chen, Stanford, CA (US); Joseph Divyan Thomas, West Lafayette, IN (US)

( * ) Notice: Subject to any disclaimer, the term of this patent is extended or adjusted under 35 U.S.C. 154(b) by 214 days.

(21) Appl. No.: 17/544,787

(22) Filed: Dec. 7, 2021

(65) Prior Publication Data

US 2022/0180647 A1 Jun. 9, 2022

Related U.S. Application Data

(60) Provisional application No. 63/122,923, filed on Dec. 8, 2020.

(51) Int. Cl.
| | |
|---|---|
| G06V 20/59 | (2022.01) |
| G06V 10/75 | (2022.01) |
| G06V 10/82 | (2022.01) |
| G06V 20/64 | (2022.01) |

(52) U.S. Cl.
CPC ............ *G06V 20/59* (2022.01); *G06V 10/751* (2022.01); *G06V 10/82* (2022.01); *G06V 20/64* (2022.01)

(58) Field of Classification Search
CPC ...... G06V 20/59; G06V 10/751; G06V 10/82; G06V 20/64; G06V 20/41; G06V 2201/02
See application file for complete search history.

(56) References Cited

PUBLICATIONS

"Wasiq Khan et. al., flight Guardian: Autonomous Flight Safety Improvement by Monitoring Aircraft Cockpit Instruments, Apr. 2018, Journal of Aerospace Information Systems, vol. 15, No. 4, 2018" (Year: 2018).*
"Jay Young et. al., Making Sense of Indoor Spaces Using Semantic Web Mining and Situated Robot Perception, Part of the Lecture Notes in Computer Science book series, vol. 10577, the Semantic Web: ESWC 2017 Satellite Events, pp. 299-313" (Year: 2017).*
"Marc Wenninger, Automated Image-based Testing of Smartphone User-Interfaces in Automotive Applications, 2013, Hochschule Rosenheim Faculty of Computer Science" (Year: 2013).*
"Anvardh Nanduri et. al., Anomaly Detection in Aircraft Data using Recurrent Neural Networks RNN, Apr. 2016, 2016 Integrated Communications Navigation and Surveillance ICNS" (Year: 2016).*
"Vladimir Socha et. al., Pilots' Performance and Workload Assessment: Transition from Analogue to Glass-Cockpit, Jul. 2020, Appl. Sci. 2020, 10, 5211" (Year: 2020).*

(Continued)

*Primary Examiner* — Andrae S Allison
*Assistant Examiner* — Phuong Hau Cai

(57) ABSTRACT

Methods, apparatus, and system to acquire aircraft flight data through visual analysis of flight instruments with a data capture neural network, to compare aircraft flight data to a standard of a flight maneuver with a data analysis neural network with minimal or no human input, to output a visualization of aircraft flight data and or analysis of aircraft flight data, and to acquire aircraft flight data, programmatically analyze aircraft flight data, and provide aircraft training to a prospective aircraft pilot.

19 Claims, 14 Drawing Sheets

(56) References Cited

PUBLICATIONS

"Tomas Cipra et. al., Robust Kalman filter and its application in time series analysis, 1991, Kybernetika, vol. 27 (1991), No. 6, 481-494" (Year: 1991).*

"Erin E. Accettullo, Instrument pilot skill acquisition in the early phases of flight training using an advanced cockpit display system, 2004, mbry-Riddle Aeronautical University ProQuest Dissertations Publishing, 2004. EP32067" (Year: 2004).*

"Zihao Cao et al., Improving Prediction Accuracy in LSTM Network Model for Aircraft Testing Flight Data, Sep. 2018, 2018 IEEE International Conference on Smart Cloud, New York, USA" (Year: 2018).*

"S. Malek et al., Tracking Chessboard Corners using Projective Transformation for Augmented Reality, Mar. 2011, 2011 International Conference on Communications, Computing and Control Applications, Hammamet Tunisia" (Year: 2011).*

* cited by examiner

COLLECTION, PROCESSING, AND OUTPUT OF FLIGHT INFORMATION METHOD, SYSTEM, AND APPARATUS

FIELD

The present disclosure relates to a computing device, in particular to a computing device to use a machine learning neural network to at least one of capture flight data from visual analysis of a flight instrument in an aircraft, to compare a time-series of flight data to a standard of a flight maneuver, and to output an interpretation of the time-series of the flight data relative to the standard of the flight maneuver.

BACKGROUND

There may be a significant shortage of aircraft pilots in coming years, which may generate significant demand for trained pilots. Aircraft pilot training typically occurs through flight time in an aircraft with an instructor and through use of simulators, with or without an instructor. Simulators allow instructors and students to review flight maneuvers to, for example, check whether maneuvers were conducted within standards.

Simulators can range from 2-dimensional simulations on a computer screen to complex and expensive simulators which include a gimbaled "cockpit" which can simulate roll, pitch, and yaw and which can project real-life video imagery onto interior screens. However, even complex simulators cannot simulate gross acceleration and will never entirely replace practical hands-on training. In addition, many small aircraft are too inexpensive to justify the cost of a complex simulator.

When an instructor is in an aircraft with a student, the instructor may have to pay attention to multiple information sources, including aircraft flight data, as well as what the student is doing. The instructor may not have a historical record of what the student did, apart from flight data recorders and cockpit voice recorders, which are often not able to provide historical information. Instructors may record video of flight training sessions, though it may require a significant amount of time to review a video, parse what happened, when, and the video may not capture information from the flight instruments.

Acquisition of aircraft flight data typically occurs through systems which are built into aircraft; e.g. Flight data recorders and or cockpit voice recorders record aircraft flight data and audio from cockpits. Typically, this information is recorded to document an aircraft's flight history, as may be relevant following an accident or a non-standard procedure. As noted, this information may or may not be available to support training.

Interfacing with aircraft flight data recorders and with flight instruments is not trivial, in large part because they must be reliable and because information they capture must be kept secure.

In addition, aircraft commonly operate for decades; non-standard or heterogeneous dials, gauges, and instruments may be installed over time.

Needed is a method, system, and apparatus to acquire aircraft flight data through visual analysis of flight instruments by a machine learning neural network, without electrical connection to either flight data recorders nor flight instruments; furthermore, needed is a method, system, and apparatus to compare aircraft flight data relative to a standard of a flight maneuver, with minimal or no human input; needed is a method, system, and apparatus to output a visualization of aircraft flight data and or analysis of aircraft flight data; needed is a method system, and apparatus to acquire aircraft flight data, programmatically analyze aircraft flight data, and provide aircraft training to a prospective aircraft pilot.

DETAILED DESCRIPTION

Figure 1A:
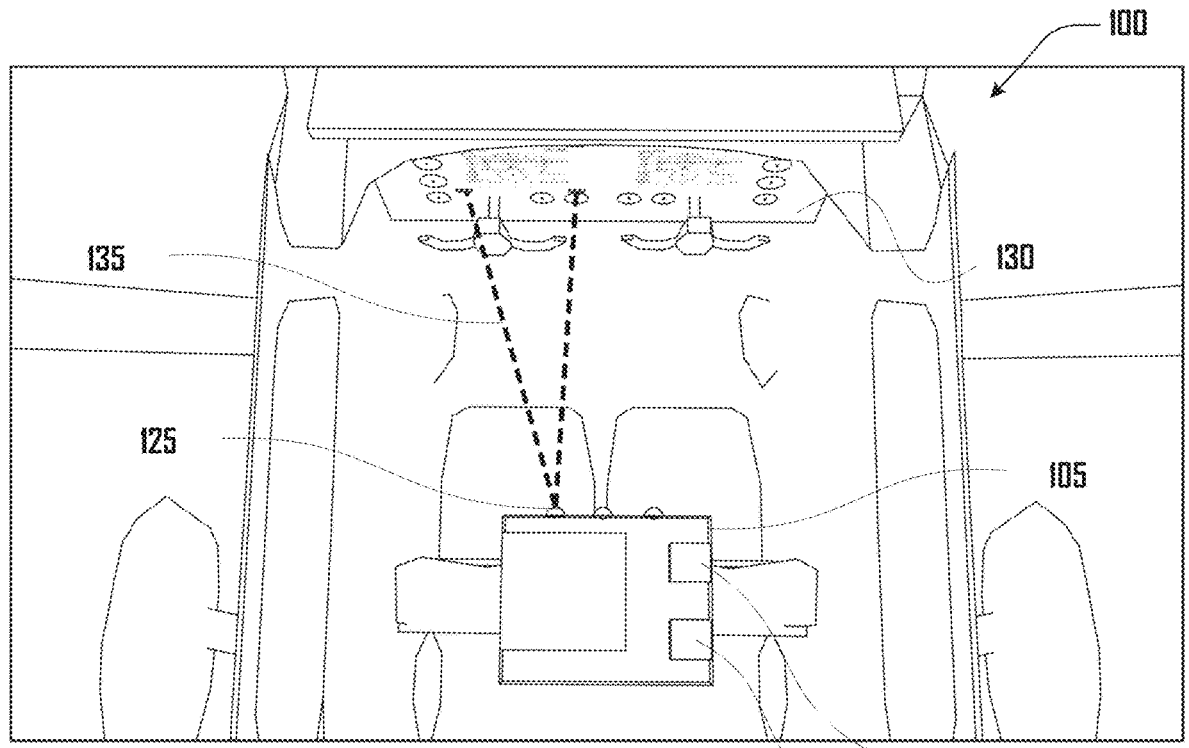
FIG. 1A is first oblique perspective illustration of an aircraft cockpit comprising a flight information runtime computer device, incorporated with teachings of the present disclosure, according to some embodiments.

In addition to other locations, defined terms may be found at the end of this Detailed Description.

In overview, this disclosure relates to an apparatus and methods performed by and in a runtime computer device apparatus, referred to herein as flight information runtime computer system 105, to acquire aircraft flight data through visual analysis of flight instruments with a data capture neural network, to compare aircraft flight data to a standard of a flight maneuver with a data analysis neural network with minimal or no human input, to output a visualization of aircraft flight data and or analysis of aircraft flight data, and to acquire aircraft flight data, programmatically analyze aircraft flight data, and provide aircraft training to a prospective aircraft pilot. The data capture neural network and data analysis neural networks may be trained; included in this disclosure are an apparatus and methods performed in a neural network training computer device apparatus, referred to herein as flight information machine learning computer 700, to train the data capture neural network and the data analysis neural network.

Flight information runtime computer system 105 and flight information machine learning computer device 700 may include hardware acceleration module(s) to accelerate the performance of modules by hardware of these apparatuses, for example, to allow the modules to operate in what a user perceives as real time, to produce enhanced results in a short period of time, or to reduce the time and cost required to perform neural network training.

Flight information machine learning computer device 700 may comprise data capture neural training module 900. When executed, data capture neural training module 900 may train data capture neural network 815 to capture flight data from neural network analysis of images comprising flight instruments. Flight information machine learning computer device 700 may comprise data analysis neural training module 1000. When executed, data analysis neural training module 1000 may train flight analysis neural network 820 to compare time-series flight data to a standard of a flight maneuver and output an interpretation of the time-series of the flight data relative to the standard of the flight maneuver.

Flight information machine learning computer device 700 may perform runtime generation module 1100 to package data capture neural network 815 with a hardware interface for flight information runtime computer system 105 and to create runtime data capture module 1200. Flight information machine learning computer device 700 may perform runtime generation module 1100 to package flight analysis neural network 820 with a hardware interface for flight information runtime computer system 105 and to create runtime data analysis module 1300.

The hardware interfaces prepared by runtime generation module 1100 may allow flight information runtime computer system 105 and modules performed by flight information runtime computer system 105, e.g. runtime data capture module 1200 and runtime data analysis module 1300, to interface with one or more humans, to interface with other processes, and to interface with hardware input devices. For example, the hardware interface prepared by runtime generation module 1100 may allow runtime data capture module 1200 to obtain images, e.g. photographs, or a sequence of images, e.g. video, from a camera in flight information runtime computer system 105 in an aircraft, so that runtime data capture module 1200 can process the images with runtime data capture neural network 815 and determine flight data values from flight instruments in the images. For example, the hardware interface prepared by runtime generation module 1100 may allow runtime data capture module 1200 to save comparative data, e.g. from an inertial measurement unit ("IMU"), an altimeter, a global positioning system ("GPS") receiver, or an inclinometer, e.g. from comparative data source 115, to one or more comparative date 825 records so that runtime data capture module 1200 may compare the comparative data 825 to the neural network flight data 805 records and reject or correct outliers in neural network flight data 805 records. For example, the hardware interface prepared by runtime generation module 1100 may allow runtime data analysis module 1300 to obtain time-series flight data from, for example, runtime data capture module 1200, so that runtime data analysis module 1300 may process it with runtime flight analysis neural network 820 to compare time-series flight data to the standard of the flight maneuver and output an interpretation of the time-series of the flight data relative to the standard of the flight maneuver. The hardware interface may further allow human input into modules of flight information runtime computer system 105, such as into visualization module 110, such as to allow human selection of an aircraft in which a flight maneuver is to be performed, to allow human selection of the standard flight maneuver which is or was performed, to allow human interaction with imaging (such as to confirm that a flight instrument is imaged by a camera), to allow human review of output of the interpretation of the time-series of the flight data relative to the standard of the flight maneuver, such as for flight training purposes, and the like.

In this way, flight information machine learning computer device 700 and flight information runtime computer system 105 and modules thereof may be trained to and may acquire aircraft flight data through visual analysis of flight instruments with a data capture neural network, compare aircraft flight data to a standard of a flight maneuver with a data analysis neural network with minimal or no human input, output a visualization of aircraft flight data and or analysis of aircraft flight data, and or may acquire aircraft flight data, programmatically analyze aircraft flight data, and provide aircraft training to a prospective aircraft pilot, with minimal or reduced demand on a human trainer.

Figure 1B:
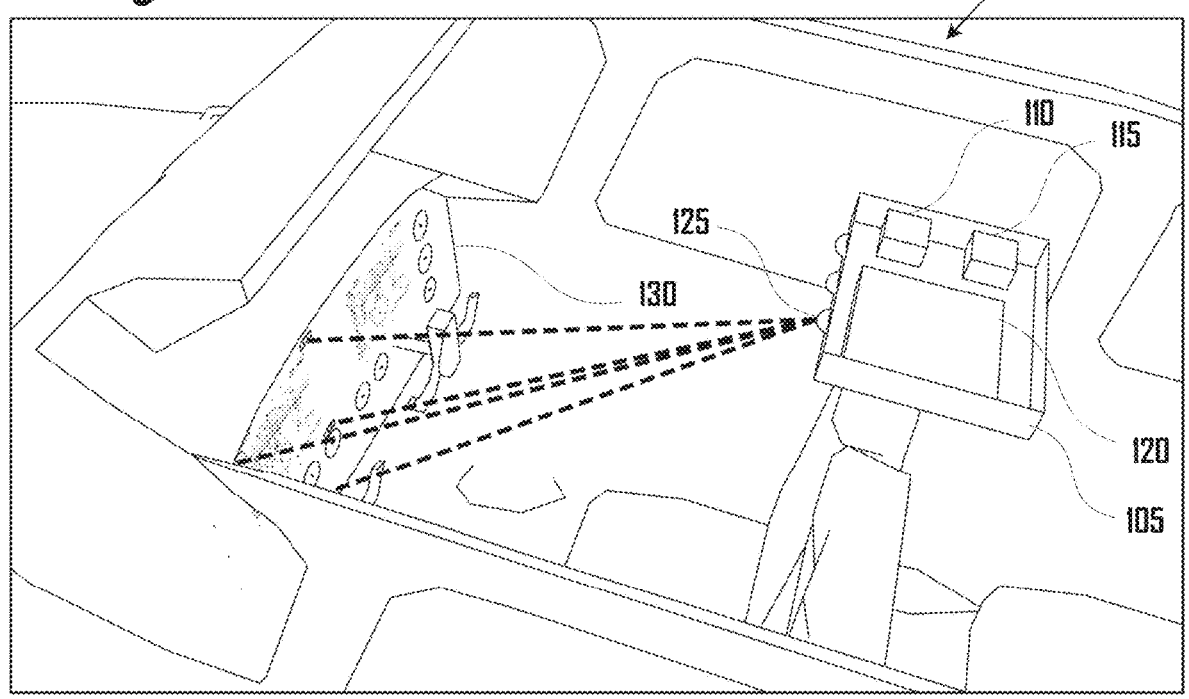
FIG. 1B is second oblique perspective illustration of the aircraft cockpit comprising the flight information runtime computer device of FIG. 1A, incorporated with teachings of the present disclosure, according to some embodiments.

FIG. 1A is first oblique perspective illustration of aircraft cockpit 100 comprising flight information runtime computer device 105, incorporated with teachings of the present disclosure, according to some embodiments. FIG. 1B is second oblique perspective illustration of aircraft cockpit 100 comprising flight information runtime computer device 105 of FIG. 1A, incorporated with teachings of the present disclosure, according to some embodiments.

As illustrated, flight information runtime computer device 105 may be mounted within aircraft cockpit 100 with a view of instrument panel 130 in aircraft cockpit 100. The mounting location may be on a ceiling of aircraft cockpit 100, may be on a side-panel of aircraft cockpit 100, or in another location. As illustrated, flight information runtime computer device 105 may comprise one or more cameras, such as camera 125, with a view of instrument panel 130. Instrument panel 130 may comprise analog instruments, digital instruments, switches, and the like. In embodiments, camera 125 may be separate from flight information runtime computer device 105, may be provided with an independent power supply, and may be provided with wireline or wireless data connection to flight information runtime computer device 105 and modules thereof. In embodiments, one or more mirrors may provide flight information runtime computer device 105 and or cameras thereof with a view of instrument panel 130. Sightlines 135 from camera 125 to instrument panel 130 indicate an area of interest within instrument panel 130 and do not necessarily indicate the complete field of view of camera 125 nor an image taken by camera 125.

As illustrated, flight information runtime computer device 105 may comprise one or more computer processor and memory 110. Computer processor and memory 110 are similar to flight information machine learning computer device 700 and flight information machine learning computer datastore 800, described herein, though may comprise a subset of modules thereof and may comprise additional modules, such as modules of a hardware interface prepared by runtime generation module 1100 which may be specific to hardware of flight information runtime computer device 105. Discussion herein of computer hardware of flight information machine learning computer device 700 and of flight information machine learning computer datastore 800 should be understood to describe computer processor and memory 110; e.g. computer processor and memory 110 may be synonymous with flight information machine learning computer device 700 and flight information machine learning computer datastore 800; e.g. where reference is made to records in flight information machine learning computer datastore 800, such records may be in computer processor and memory 110; e.g. where reference is made to modules in flight information machine learning computer device 700, such modules may be in computer processor and memory 110. Some of computer processor and memory 110 may be provided remotely, via a wireless connection.

Computer processor and memory 110 may comprise runtime data capture module 1200 and runtime data analysis module 1300 in memory. Runtime data capture module 1200 and runtime data analysis module 1300 may be performed by computer processor and memory 110.

Flight information runtime computer device 105 may comprise comparative data source 115. Comparative data source 115 may comprise, for example, an IMU, an altimeter, a GPS receiver, an inclinometer, or the like. Comparative data source 115 may provide information to, for example, runtime data capture module 1200, as described further herein.

As illustrated, flight information runtime computer device 105 may comprise power source 120. Power source 120 may comprise batteries, an electrical connection to an electrical system of the aircraft, power conditioning circuits, and the like. Power source 120 may be rechargeable. Power source 120 may be removable from flight information runtime computer device 105.

Figure 2A:
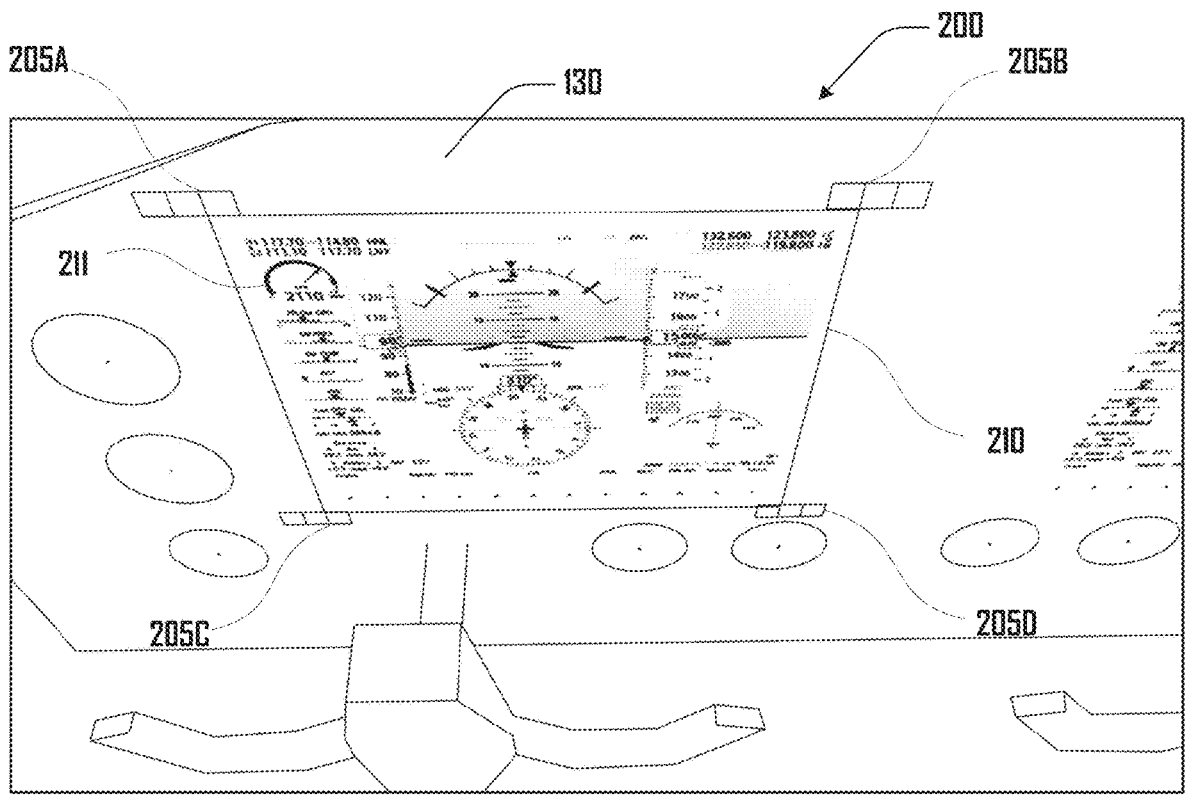
FIG. 2A is third oblique perspective illustration of a detail of the aircraft cockpit of FIG. 1A comprising an aircraft flight instrument.

FIG. 2A is oblique perspective illustration of image 200 of flight panel 130 in aircraft cockpit 100 of FIG. 1A comprising aircraft flight instrument 211 (and others, not labeled); image 200 may have been obtained by camera 125; an image obtained by camera 125 may have a different size, shape, and field of view than as illustrated in FIG. 2A. In addition to showing a visual perspective which camera 125 may have of flight panel 130, image 200 further illustrates that flight panel 130 and instrument cluster 210 thereof may be fitted with one or more fiducial markers, e.g. Fiducial marker 205A, fiducial marker 205B, fiducial marker 205C, and fiducial marker 205D. As discussed herein, fiducial marker(s) may be used to assist with a perspective transformation of image 200 and or to assist with identification of flight instruments in image 200. Fiducial markers may be square, rectangular, or other shapes and may act as reference points or locations; fiducial markers may comprise encode information, as in a "QR" code or an ArUco code. As noted, instrument cluster 210 may comprise analog instruments, digital instruments, switches, dials, and the like. Fiducial markers may be located with respect to instrument cluster 210 and or with respect to individual flight instruments 211.

Figure 2B:
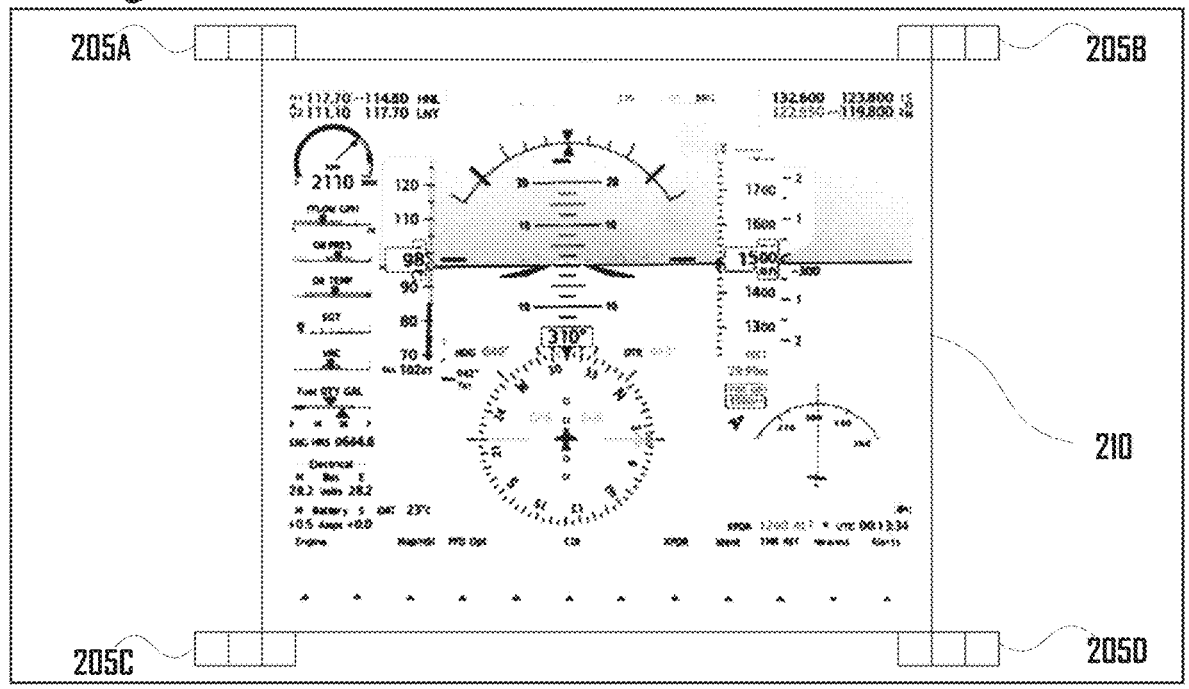
FIG. 2B is an illustration of a perspective transformation of the aircraft flight instrument of FIG. 2A by a runtime data capture module of the present disclosure, incorporated with teachings of the present disclosure, according to some embodiments.

FIG. 2B is an illustration of a portion of a perspective transformation 220 of image 200 of FIG. 2A. As described herein, perspective transformation 220 of image 200 may be obtained or produced by runtime data capture module 1200. As discussed herein, perspective transformation 220 may flatten image 200 and otherwise remove perspective and foreshortening, which may aid runtime data capture module 1200 in identifying flight instruments and flight data in image 200. Please see the discussion herein regarding runtime data capture module 1200. Because data capture neural network 815 of runtime data capture module 1200 is trained by data capture neural training module 900 on images such as image 200, please also see the discussion herein regarding data capture neural training module 900.

Figure 3:
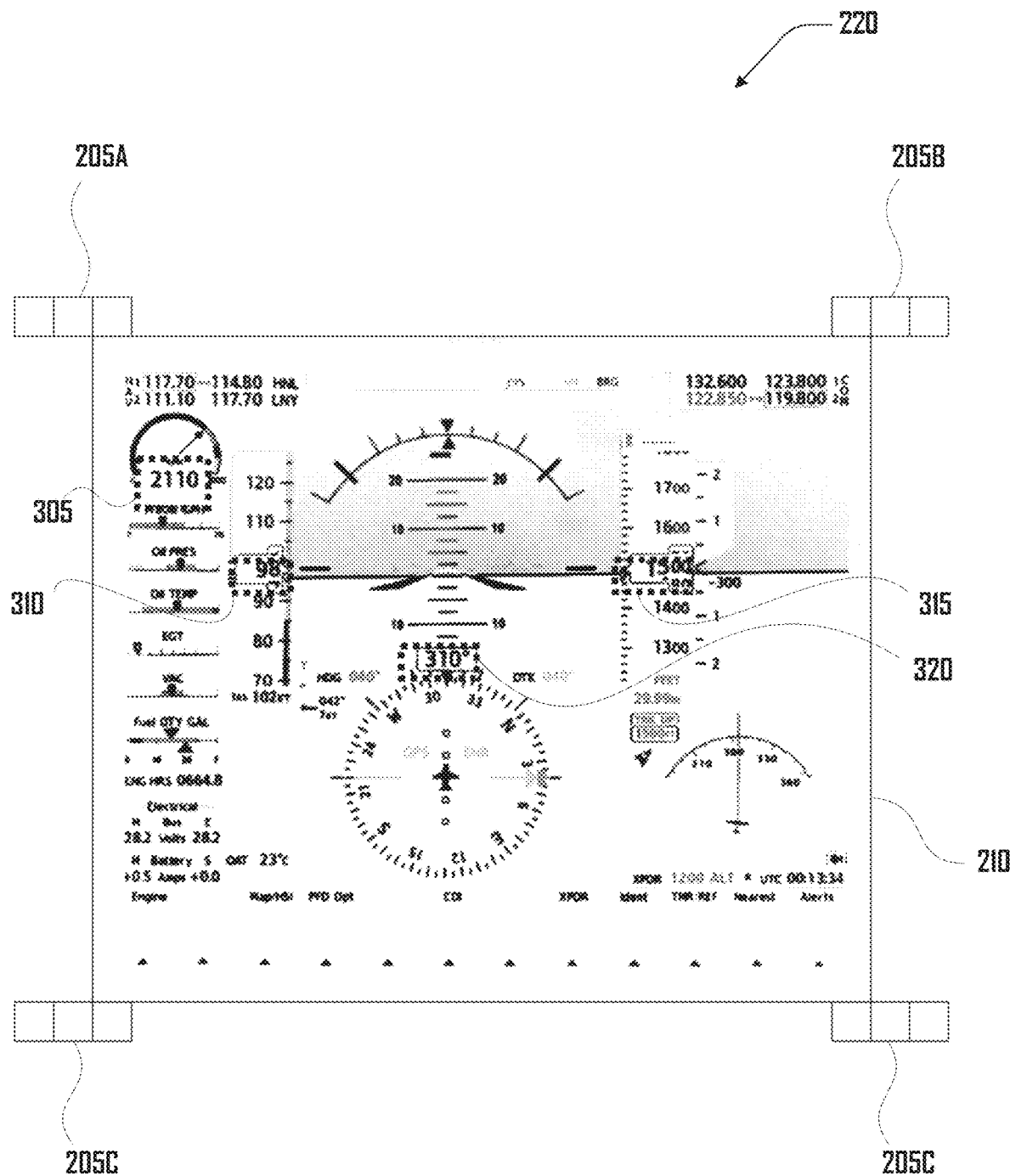
FIG. 3 is an illustration of the perspective transformation of the aircraft flight instrument of FIG. 2B, with emphasis on portions of the aircraft flight instrument processed by the runtime data capture module of the present disclosure, according to some embodiments.

FIG. 3 is an illustration of perspective transformation 220 of FIG. 2B, with emphasis on portions of the aircraft flight instrument processed by runtime data capture module 1200 of the present disclosure, according to some embodiments. The emphasized portions may comprise flight instrument object 305, flight instrument object 310, flight instrument object 315, and flight instrument object 320, identified by runtime data capture module 1200 as flight instrument objects within perspective transformation 220 of image 200. The flight instruments underlying these flight instrument objects, e.g. flight instrument 211, may output, for example, engine status information, brake status information, compass heading information, altitude, height above ground, artificial horizon information, flight control surface information (e.g. aileron trim, rudder setting, etc.), aircraft status information, and the like. The emphasized portions in FIG. 3 and other of the figures herein are by way of example, only. Please see the discussion herein regarding runtime data capture module 1200. Because data capture neural network 815 of runtime data capture module 1200 is trained by data capture neural training module 900 on images such as image 200, please also see the discussion herein regarding data capture neural training module 900.

Figure 4:
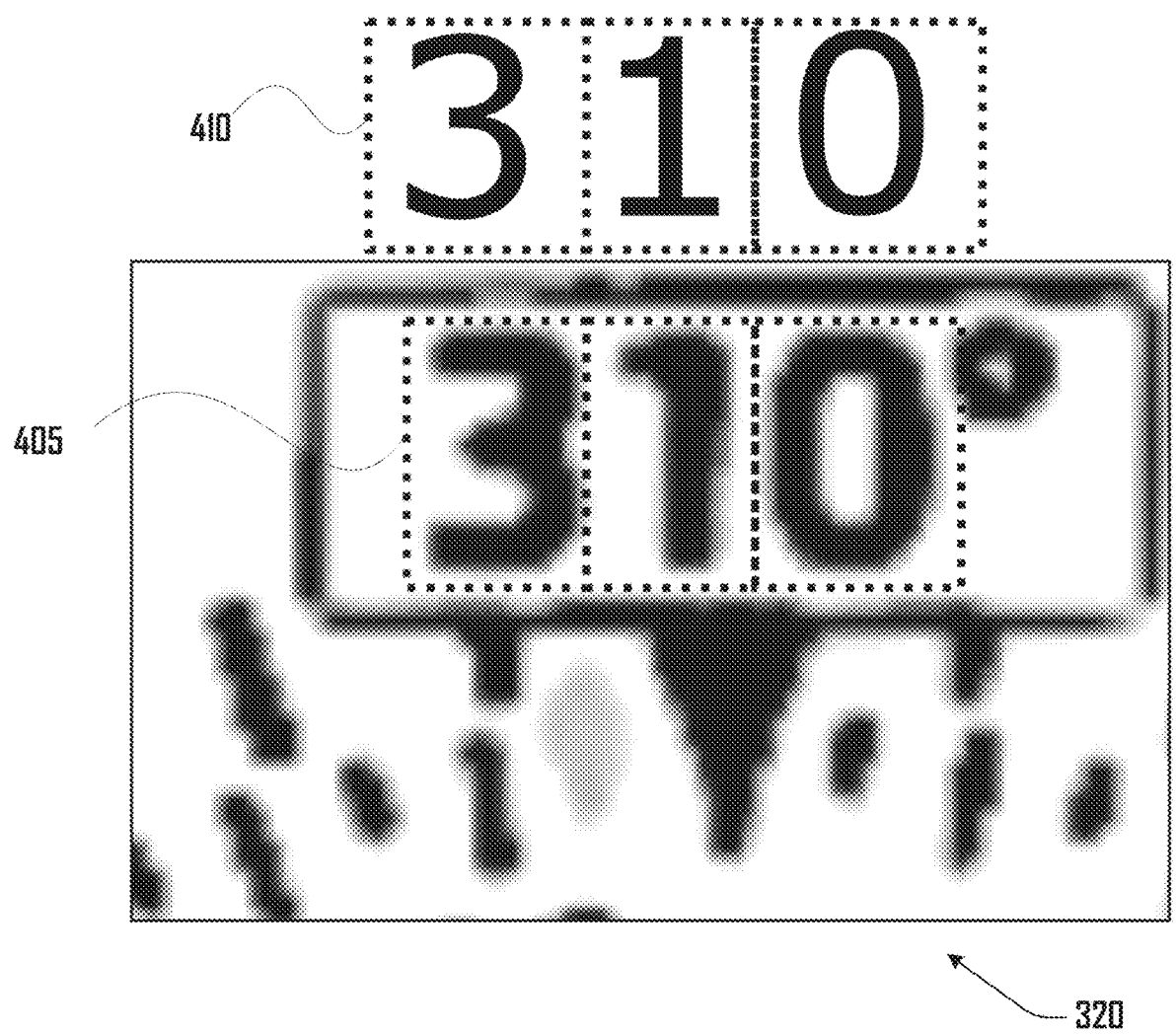
FIG. 4 is an illustration of a detail of the perspective transformation of the aircraft flight instrument of FIG. 2B, with emphasis on portions of the aircraft flight instrument processed by the runtime data capture module of the present disclosure and flight data captured thereby, according to some embodiments.

FIG. 4 is an illustration of a detail of flight instrument 320 of perspective transformation 220 of image 200 of aircraft instrument panel 130 of FIG. 2B. As discussed herein, number "310", labeled as element 410 in FIG. 4, may be identified as a value corresponding to flight instrument object value 405, in flight instrument object 320, by runtime data capture module 1200. Number "310" may be stored by runtime data capture module 1200 in one or more neural network flight data 805 records. Please see the discussion herein regarding runtime data capture module 1200. Because data capture neural network 815 of runtime data capture module 1200 is trained by data capture neural training module 900 on images such as image 200, please also see the discussion herein regarding data capture neural training module 900.

Figure 5:
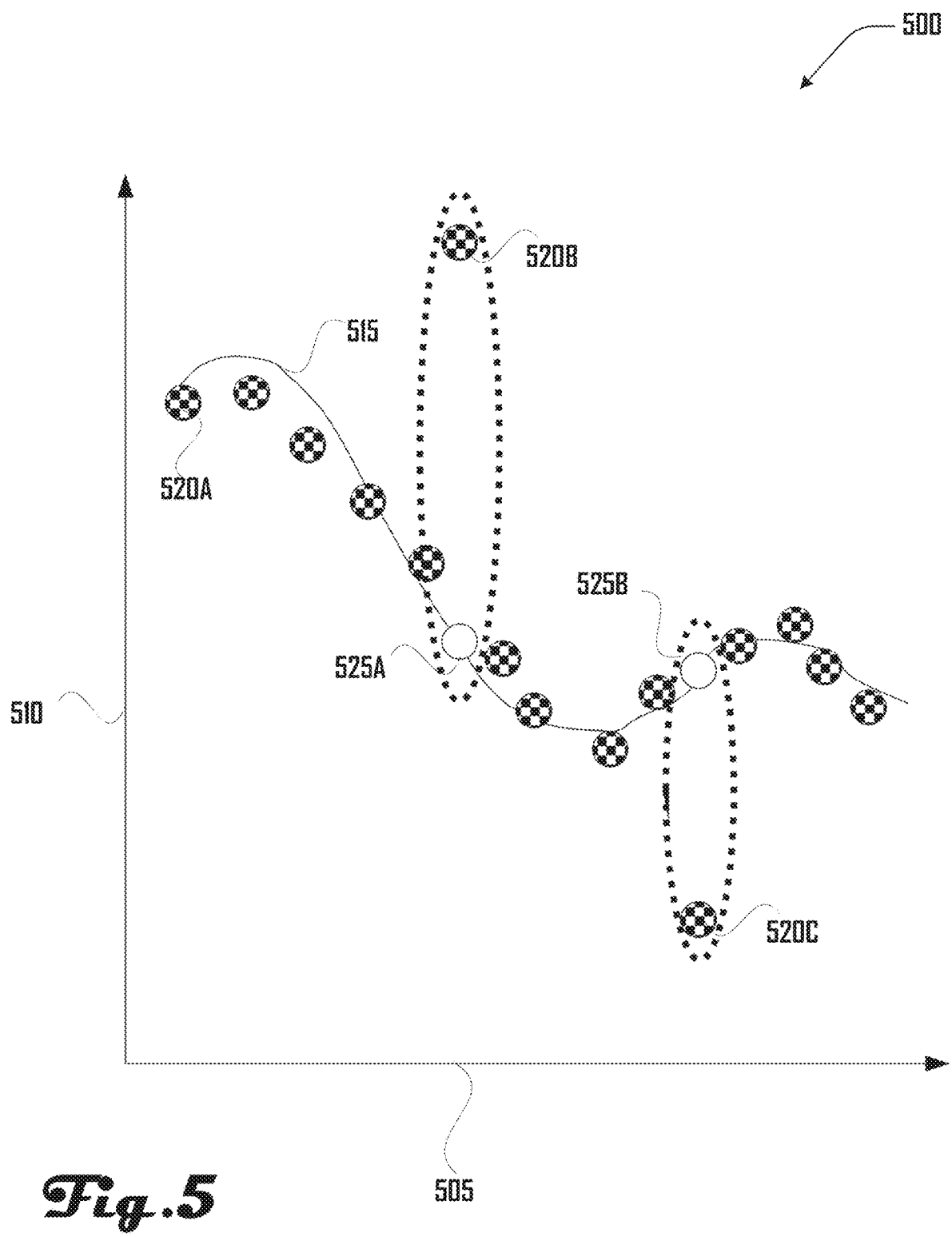
FIG. 5 is an illustration of a visualization of flight data obtained from the runtime data capture module of the present disclosure and from an inertial measurement unit of the flight information runtime computer device of the present disclosure, according to some embodiments.

FIG. 5 is a graph 500 comprising neural network flight data 520, comparative data 515, and corrected flight data 525.

As discussed herein, runtime data capture module 1200 of flight information runtime computer system 105 may obtain neural network flight data 520 from data capture neural network 815; runtime data capture module 1200 may store neural network flight data 520 in one or more neural network flight data 805 records. As discussed herein, runtime data capture module 1200 may obtain comparative data 515 from comparative data source 115 of flight information runtime computer device 105; runtime data capture module 1200 may store comparative data 515 in one or more comparative data 825 records.

In graph 500, axis 510 represents airspeed and axis 505 represents time. Comparative data 515 from comparative data source 115 is illustrated as a continuous line, though it may be discontinuous, while neural network flight data 520A, neural network flight data 520B, neural network flight data 520C and other unlabeled checkered dots (referred to together as neural network flight data 520) represent flight data determined by data capture neural network 815. Neural network flight data 520B and neural network flight data 520C illustrate that flight data from data capture neural network 815 may, in moments, deviate significantly from time adjacent values in neural network flight data 805 records as well as from comparative data 515 from comparative data source 115. As discussed herein, neural network flight data 520 may be obtained from visual analysis of flight instruments of an aircraft, e.g. from flight instrument 211.

The flight instruments of the aircraft may be more reliable than comparative data 515 from comparative data source 115. Neural network flight data 805 determined by runtime data capture module 1200 using runtime data capture neural network 815 may generally correspond very closely to the true output of the aircraft's flight instruments, notwithstanding periodic errors. Please compare line 515 to neural network flight data 520. However, in moments in which neural network flight data 520 produces an error, e.g. at neural network flight data 520B or neural network flight data 520C, comparative data source 115 can be used, e.g. by runtime data capture module 1200, to generate a correction, e.g. corrected flight data 525A and corrected flight data 525B (referred to together as corrected flight data 525). As discussed herein in relation to runtime data capture module 1200, the value of corrected flight data 525A and corrected flight data 525B may be determined by runtime data capture module 1200 through use of, for example, a filter, such as a Kalman filter. Combined, corrected flight data 525 and neural network flight data 520 may be referred to as corrected neural network flight data.

Corrected neural network flight data may be output in a hardware user interface and or a runtime application, such as visualization module 110. An example of corrected neural network flight data output in a visualization module, such as visualization module 110, may be seen in FIG. 14.

Figure 6:
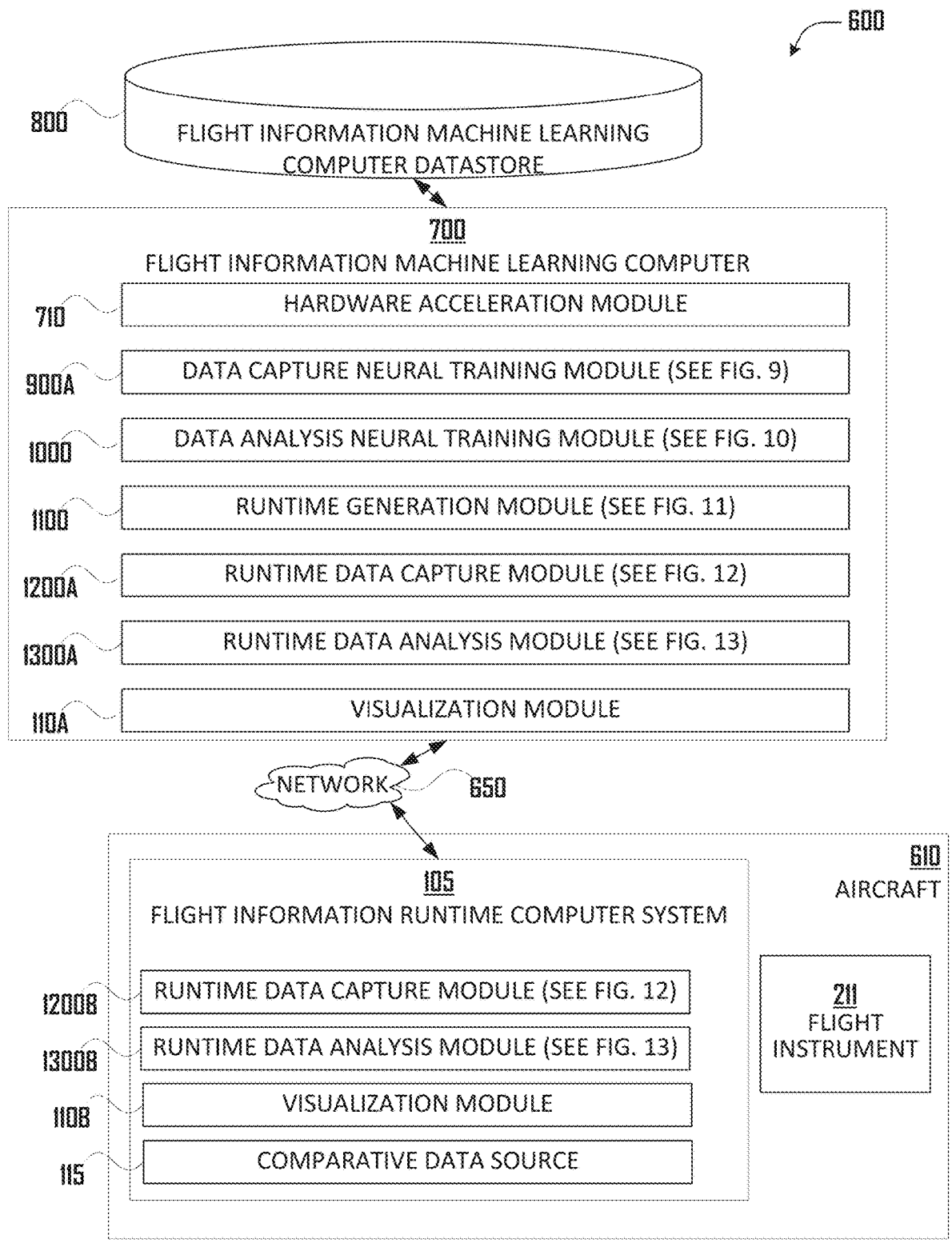
FIG. 6 is a network and device diagram illustrating an example of a flight information machine learning computer device, a flight information machine learning computer device datastore, an aircraft, a flight information runtime computer device, and a network incorporated with teachings of the present disclosure, according to some embodiments.

FIG. 6 is a network and device diagram illustrating an example of flight information machine learning computer device 700, flight information machine learning computer device datastore 800, aircraft 610, flight information runtime computer device 105, and network 650 incorporated with teachings of the present disclosure, according to some embodiments.

Figure 7:
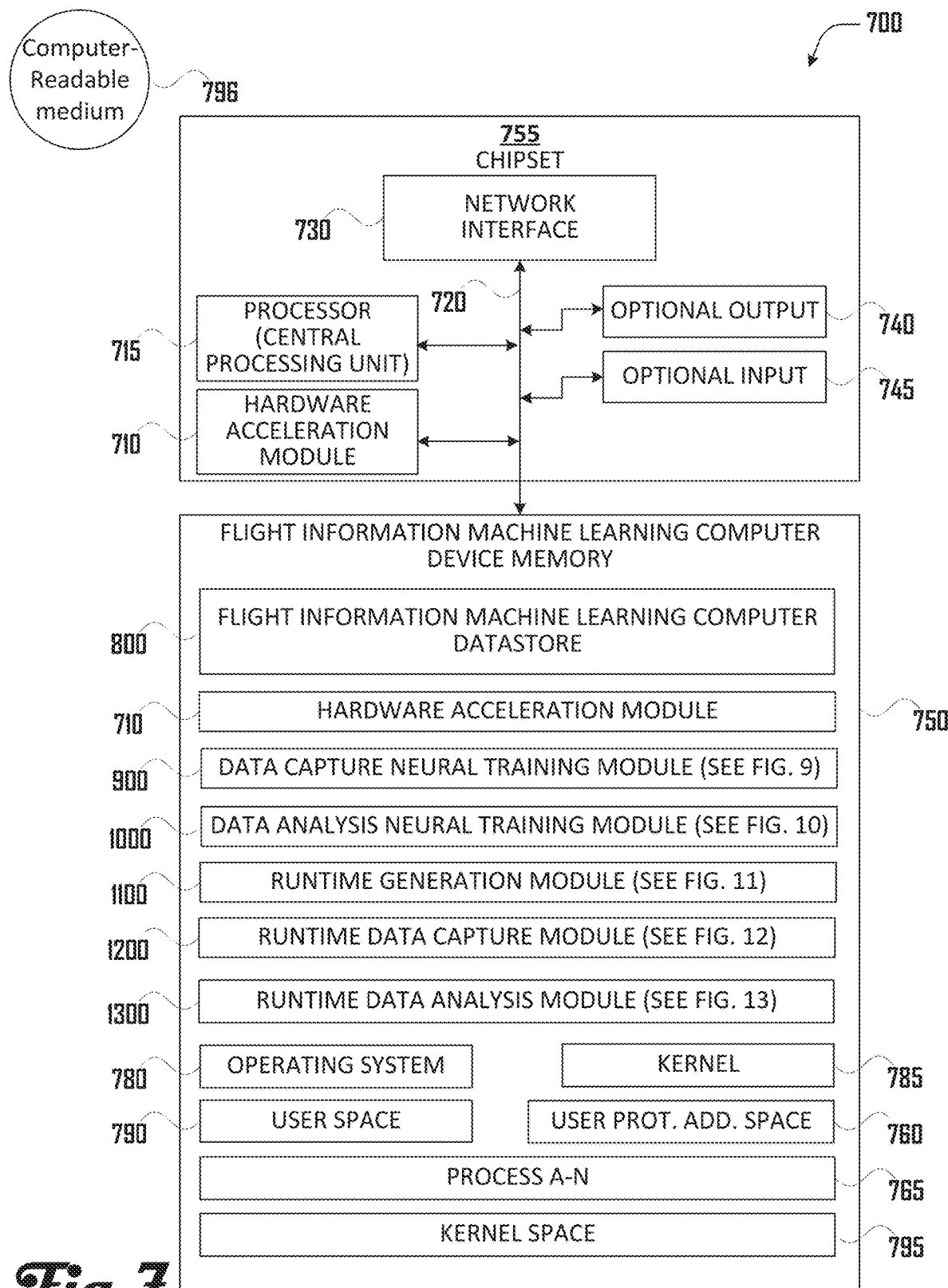
FIG. 7 is a functional block diagram illustrating an example of the flight information machine learning computer device of FIG. 1, incorporated with teachings of the present disclosure, according to some embodiments.

Flight information machine learning computer device datastore 800 illustrated in FIG. 6 may be connected with network 650 and or flight information machine learning computer device 700, described further in relation to FIG. 7.

Flight information machine learning computer device 700 is illustrated as connecting to flight information machine learning computer device datastore 800. Flight information machine learning computer device datastore 800 is described further, herein, though, generally, should be understood as a datastore used by flight information machine learning computer device 700.

Network 650 may comprise computers, network connections among the computers, and software routines to enable communication between the computers over the network connections. Examples of Network 650 comprise an Ethernet network, the Internet, and/or a wireless network, such as a GSM, TDMA, CDMA, EDGE, HSPA, LTE or other network provided by a wireless service provider. Connection to Network 650 may be via a Wi-Fi connection. More than one network may be involved in a communication session between the illustrated devices. Connection to Network 650 may require that the computers execute software routines which enable, for example, the seven layers of the OSI model of computer networking or equivalent in a wireless phone network.

FIG. 7 is a functional block diagram illustrating an example of flight information machine learning computer device 700, incorporated with teachings of the present disclosure, according to some embodiments. Flight information machine learning computer device 700 may include chipset 755. Chipset 755 may include processor 715, input/output (I/O) port(s) and peripheral devices, such as output 740 and input 745, and network interface 730, and computer device memory 750, all interconnected via bus 720. Network interface 730 may be utilized to form connections with network 650, with flight information machine learning computer device datastore 800, or to form device-to-device connections with other computers.

Chipset 755 may include communication components and/or paths, e.g., buses 720, that couple processor 715 to peripheral devices, such as, for example, output 740 and input 745, which may be connected via I/O ports. Processor 715 may include one or more execution cores (CPUs). For example, chipset 755 may also include a peripheral controller hub (PCH) (not shown). In another example, chipset 755 may also include a sensors hub (not shown). Input 745 and output 740 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 745 and output 740 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by data capture neural training module 900, data analysis neural training module 1000, runtime generation module 1100, runtime data capture module 1200, runtime data analysis module 1300, and visualization module 110. Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open-source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In embodiments, hardware acceleration module 210 may be or comprise a programmed field programmable gate array ("FPGA"), i.e., a FPGA comprising gate arrays configured with a bit stream to embody the logic of the hardware accelerated function (equivalent to the logic provided by the executable instructions of a software embodiment of the function). In embodiments, hardware acceleration module 210 may also or alternatively include components of or supporting computer device memory 750.

Computer device memory 750 may generally comprise a random-access memory ("RAM"), a read only memory ("ROM"), and a permanent mass storage device, such as a disk drive or SDRAM (synchronous dynamic random-access memory). Computer device memory 750 may store program code for modules and/or software routines, such as, for example, hardware acceleration module 210, data capture neural training module 900, data analysis neural training module 1000, runtime generation module 1100, runtime data capture module 1200, runtime data analysis module 1300, and visualization module 110.

Computer device memory 750 may also store operating system 780. These software components may be loaded from a non-transient computer readable storage medium 796 into computer device memory 750 using a drive mechanism associated with a non-transient computer readable storage medium 796, such as a floppy disc, tape, DVD/CD-ROM drive, memory card, or other like storage medium. In some embodiments, software components may also or instead be loaded via a mechanism other than a drive mechanism and computer readable storage medium 796 (e.g., via network interface 730).

Figure 8:
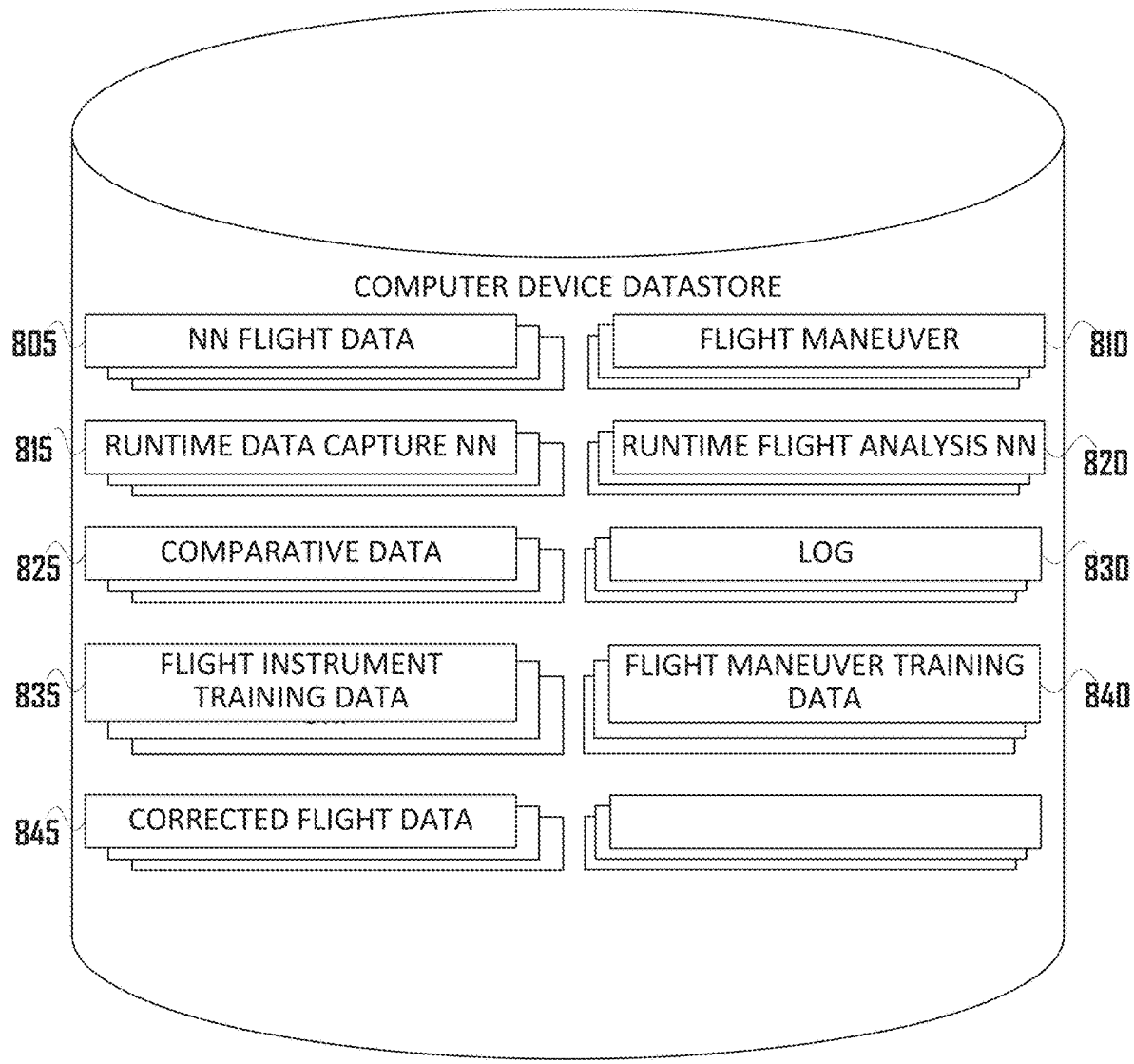
FIG. 8 is a functional block diagram illustrating an example of a flight information machine learning computer device datastore incorporated with teachings of the present disclosure, according to some embodiments.

Computer device memory 750 is also illustrated as comprising kernel 785, kernel space 795, user space 790, user protected address space 760, and flight information machine learning computer device datastore 800 (illustrated and discussed further in relation to FIG. 8).

Computer device memory 750 may store one or more process 765 (i.e., executing software application(s)). Process 765 may be stored in user space 790. Process 765 may include one or more other process 765a . . . 765n. One or more process 765 may execute generally in parallel, i.e., as a plurality of processes and/or a plurality of threads.

Computer device memory 750 is further illustrated as storing operating system 780 and/or kernel 785. The operating system 780 and/or kernel 785 may be stored in kernel space 795. In some embodiments, operating system 780 may include kernel 785. Operating system 780 and/or kernel 785 may attempt to protect kernel space 795 and prevent access by certain of process 765a . . . 765n.

Kernel 785 may be configured to provide an interface between user processes and circuitry associated with flight information machine learning computer device 700. In other words, kernel 785 may be configured to manage access to processor 715, chipset 755, I/O ports and peripheral devices by process 765. Kernel 785 may include one or more drivers configured to manage and/or communicate with elements of flight information machine learning computer device 700 (i.e., processor 715, chipset 755, I/O ports and peripheral devices).

Flight information machine learning computer device 700 may also comprise or communicate via bus 720 and/or network interface 730 with flight information machine learning computer device datastore 800, illustrated and discussed further in relation to FIG. 8. In various embodiments, bus 720 may comprise a high-speed serial bus, and network interface 730 may be coupled to a storage area network ("SAN"), a high speed wired or wireless network, and/or via other suitable communication technology. Flight information machine learning computer device 700 may, in some embodiments, include many more components than as illustrated. However, it is not necessary that all components be shown in order to disclose an illustrative embodiment.

FIG. 8 is a functional block diagram of the flight information machine learning computer device datastore 800 illustrated in the computer device of FIG. 7, according to some embodiments. The components of flight information machine learning computer device datastore 800 may include data groups used by modules and/or routines, e.g, flight data 305, flight maneuver 310, runtime data capture neural network 315, runtime flight analysis neural network 320, comparative data 325, and log 830. The data groups used by modules or routines illustrated in FIG. 8 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of flight information machine learning computer device datastore 800 are discussed further herein in the discussion of other of the Figures.

Figure 9:
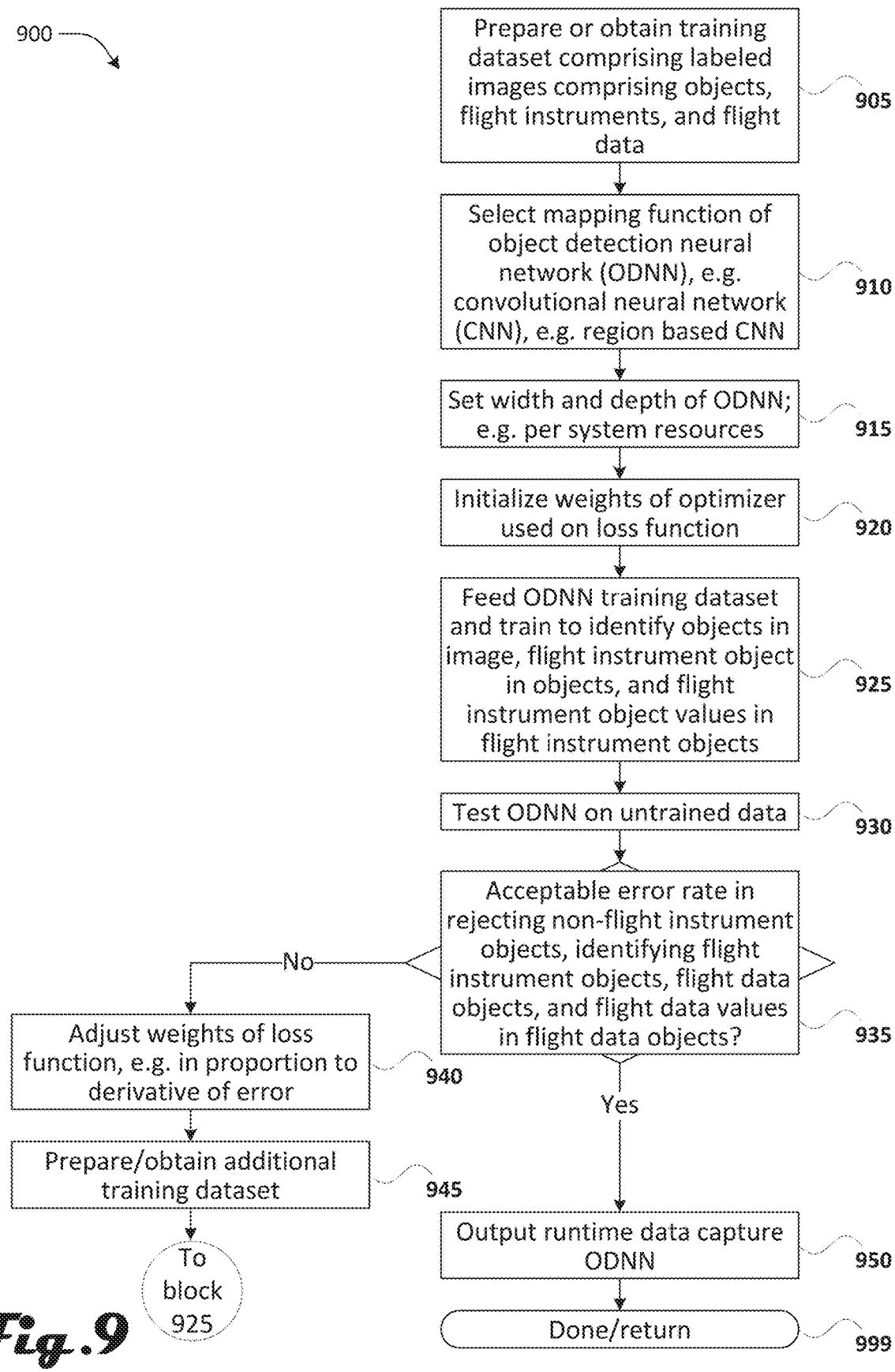
FIG. 9 is a flow diagram illustrating an example of a method performed by a data capture neural training module, incorporated with teachings of the present disclosure, according to some embodiments.

FIG. 9 is a flow diagram illustrating an example of a method performed by data capture neural training module 900, incorporated with teachings of the present disclosure, according to some embodiments. This module may be performed by or with the assistance of a hardware accelerator, such as hardware acceleration module 210. This module may be performed by, for example, flight information machine learning computer device 700.

At block 905, data capture neural training module 900 may obtain a training dataset. The training dataset may comprise images comprising objects, flight instruments, and flight data objects, and flight instrument object values which have been labeled. The images in the training dataset may be similar to image 200 and or perspective transformation 220 of image 200. The training dataset may have been subject to a perspective transformation, as may be approximated through affine or bi-linear transformations or the like. The labels may identify different objects, different flight instrument objects, e.g. flight instrument object 310 to flight instrument object 320 (which may be different types of flight instruments), and different flight instrument object values which may be output by different of the flight instrument objects, e.g. flight instrument object value 405, and different numerical, text, or other data values of flight instrument objects, e.g. element 410 of FIG. 4, in which "310" is a value corresponding to flight instrument object value 405. The training dataset may be obtained from, for example, one or more flight instrument training data 835 records.

At block 910, data capture neural training module 900 may select mapping function(s) of an object detection neural network ("ODNN"), e.g. of a convolutional neural network ("CNN"), e.g. a region-based CNN.

At block 915, data capture neural training module 900 may scale the ODNN, wherein the scale may comprise depth, width, and resolution. Depth may comprise, for example, a number of convolutional layers in the ODNN. Width may comprise, for example, a number of channels in each convolutional layer in the ODNN. Resolution may comprise, for example, the resolution of images passed to the ODNN. Width, for example, may be set based on computer resources, such as resources in flight information runtime computer system 105.

At block 920, data capture neural training module 900 may initialize weights of an optimizer used on a loss function of the ODNN. The weights may be initialized at, for example, small random values.

At block 925, data capture neural training module 900 may provide the ODNN with a portion of the training dataset of block 905. The images of the training dataset may have been processed with a perspective transformation, as may be approximated through affine or bi-linear transformations. The images may comprise multiple, different, flight instruments. The images may comprise objects, flight instrument objects in the objects, and flight instrument object values in the flight instrument objects, including such objects which have been labeled, per block 905.

At block 930, data capture neural training module 900 may test the ODNN on untrained training data, e.g. on a portion of the training dataset of block 905 not previously provided during training at block 925, to determine whether the ODNN is returning acceptable results.

At decision block 935, data capture neural training module 900 may determine whether the ODNN produces an acceptable error rate in rejecting non-flight instrument objects, in identification of flight instrument objects, and in identification of flight instrument object values in the untrained data. An acceptable error rate may be, for example, less than ten percent.

If negative or equivalent at decision block 935, at block 940, data capture neural training module 900 may adjust weights of the optimizer used on the loss function. Adjustment of weights may be, for example, in proportion to a derivative of error. If necessary or desirable, the scale of the CNN may also be adjusted.

At block 945, data capture neural training module 900 may prepare or obtain additional training set data and may then return to block 925.

At block 950, which may follow decision block 935 following an affirmative or equivalent decision, data capture neural training module 900 may output a runtime data capture object detection neural network. The output runtime data capture object detection neural network may be stored as, for example, one or more runtime data capture neural network 815 records.

At block 999, data capture neural training module 900 may conclude and/or return to a module and/or another process which may have called it.

Figure 10:
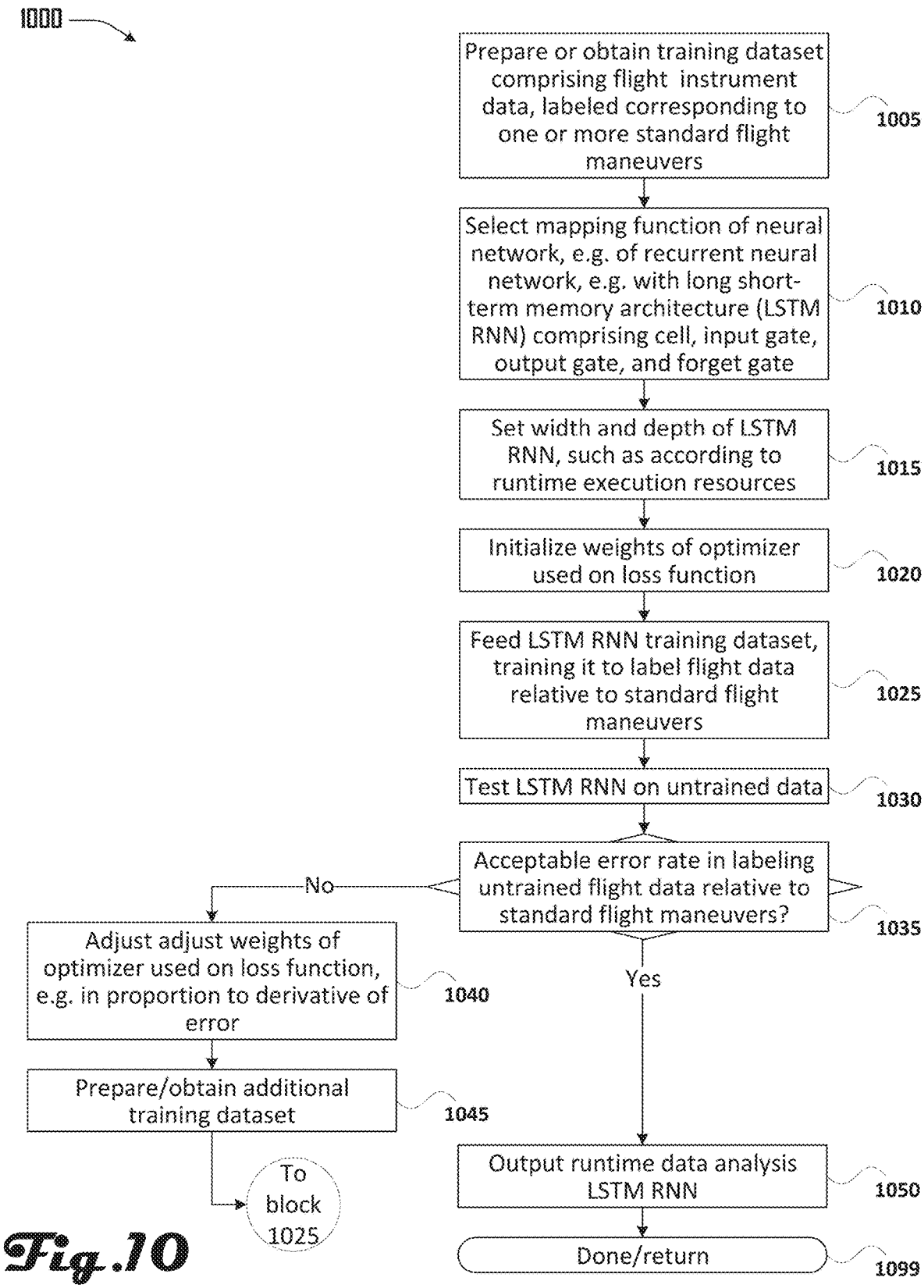
FIG. 10 is a flow diagram illustrating an example of a method performed by a data analysis neural training module, incorporated with teachings of the present disclosure, according to some embodiments.

FIG. 10 is a flow diagram illustrating an example of a method performed by data analysis neural training module 1000, incorporated with teachings of the present disclosure, according to some embodiments. This module may be performed by or with the assistance of a hardware accelerator, such as hardware acceleration module 210. This module may be performed by, for example, flight information machine learning computer device 700.

At block 1005, data analysis neural training module 1000 may obtain a training data set comprising time-series flight instrument data labeled corresponding to indicate performance relative to a standard flight maneuver, performed during the period of the time-series flight instrument data. The training data set may be obtained from one or more flight maneuver training data 840 records. The standard flight maneuver may be with respect to a type of aircraft. The standard flight maneuver may comprise, for example, slow flight, power-off stall, power-on stall, steep turn, chandelle, lazy eight, normal takeoff and climb, crosswind takeoff and climb, maximum performance takeoff and climb, normal approach and landing, and the like. The flight maneuver training data 840 records may comprise tensors of size (s×b×t), where "s" is the number of flight parameters (altitude, airspeed, and the like) used for training, "b" is the batch size that determines how many time steps are included as a labeled chunk of data, and "t" is the number of batch instances contained in the training matrix. The label data may comprise a vector of length "t", such that every training batch that is an (s×b) matrix is labelled as a single maneuver.

At block 1010, data analysis neural training module 1000 may select a mapping function of a neural network, such as a neural network which performs well with analysis of time-series data, e.g. a recurrent neural network, e.g. of a long short-term memory architecture recurrent neural network ("LSTM RNN"). The LSTM RNN may comprise, for example, a cell, an input gate, an output gate, and a forget gate.

At block 1015, data analysis neural training module 1000 may scale the LSTM RNN. The scale may comprise a depth and a width. The depth may comprise a number of layers. The width may comprise a number of channels in each layer. Scaling may be at least partially according to runtime execution resources, e.g. in flight information runtime computer system 105.

At block 1020, data analysis neural training module 1000 may initialize weights of an optimizer, e.g. of a gradient-based optimizer, used on a loss function of the LSTM RNN. The weights may be initialized at, for example, small random values.

At block 1025, data analysis neural training module 1000 may feed the LSTM RNN a portion of the training data set of block 1005, training the LSTM RNN to label flight data relative to the standard flight maneuvers.

At block 1030, data analysis neural training module 1000 may test the LSTM RNN on untrained training data, e.g. on a portion of the training dataset of block 1005 not provided during training at block 1025, to determine whether the LSTM RNN is returning acceptable results.

At decision block 1035, data analysis neural training module 1000 may determine whether the LSTM RNN produces an acceptable error rate in labeling the time-series flight data relative to untrained training data of block 1030.

If negative or equivalent at decision block 1035, at block 1040, data analysis neural training module 1000 may adjust weights of the optimizer used on the loss function. Adjustment of weights may be, for example, in proportion to a derivative of error. If necessary or desirable, the scale of the LSTM RNN may also be adjusted.

At block 1045, data analysis neural training module 1000 may prepare or obtain additional training set data and may then return to block 1025.

At block 1050, which may follow decision block 1035 following an affirmative or equivalent decision, data analysis neural training module 1000 may output a runtime data analysis neural network. The output runtime data analysis neural network may be stored as, for example, one or more runtime flight analysis neural network 820 records.

At block 1099, data analysis neural training module 1000 may conclude and/or return to a module and/or another process which may have called it.

Figure 11:
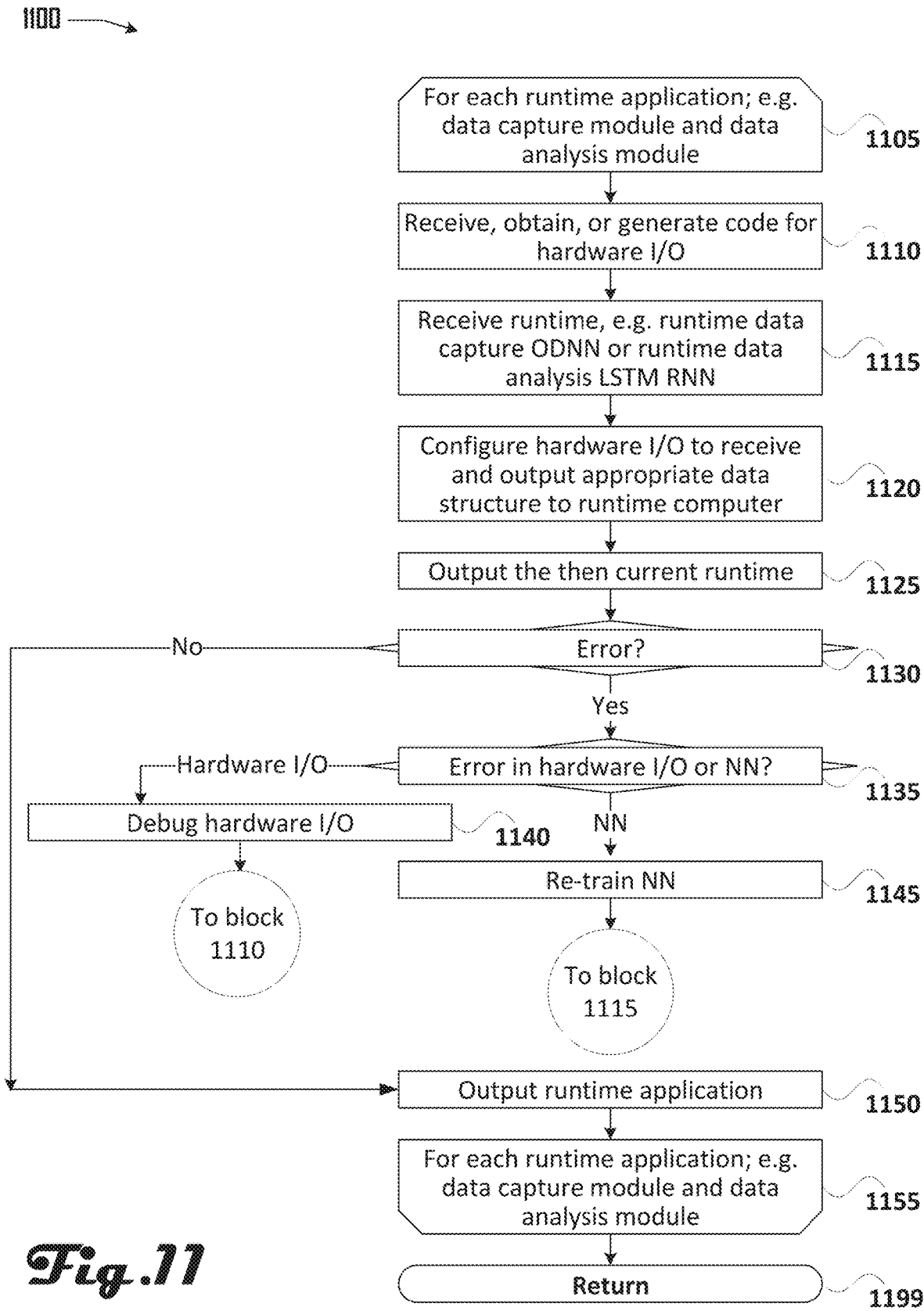
FIG. 11 is a flow diagram illustrating an example of a method performed by a runtime generation module, incorporated with teachings of the present disclosure, according to some embodiments.

FIG. 11 is a flow diagram illustrating an example of a method performed by runtime generation module 1100, incorporated with teachings of the present disclosure, according to some embodiments. This module may be performed by or with the assistance of a hardware accelerator, such as hardware acceleration module 210. This module may be performed by, for example, flight information machine learning computer device 700.

Opening loop block 1105 to closing loop block 1155 may iterate over runtime applications to be generated by runtime generation module 1100, e.g. runtime data capture module 1200 and or runtime data analysis module 1300.

At block 1110, runtime generation module 1100 may receive, obtain, or generate code for hardware interface or input/output. The hardware interface may allow hardware for a runtime execution computer to interface with one or more humans, to interface with other processes, and to interface with hardware input and output devices.

The hardware interfaces prepared or obtained by runtime generation module 1100 may allow flight information runtime computer system 105 and modules performed by flight information runtime computer system 105, e.g. runtime data capture module 1200 and runtime data analysis module 1300, to interface with one or more humans, to interface with other processes, and to interface with hardware input devices. For example, the hardware interface prepared or obtained by runtime generation module 1100 may allow runtime data capture module 1200 to obtain images, e.g. photographs, or a sequence of images, e.g. video, from a camera in flight information runtime computer system 105 in an aircraft, so that runtime data capture module 1200 can process the images with data capture neural network 815 and determine flight data values from flight instruments in the images. For example, the hardware interface prepared or obtained by runtime generation module 1100 may allow runtime data capture module 1200 to obtain comparative data, e.g. from an inertial measurement unit ("IMU"), an altimeter, a global positioning system ("GPS") receiver, or an inclinometer in the aircraft, so that runtime data capture module 1200 may compare the comparative data to the flight data values and reject outliers. For example, the hardware interface prepared or obtained by runtime generation module 1100 may allow runtime data analysis module 1300 to obtain time-series flight data from, for example, runtime data capture module 1200, so that runtime data analysis module 1300 may process it with runtime flight analysis neural network 820 to compare time-series flight data to the standard of the flight maneuver and output an interpretation of the time-series of the flight data relative to the standard of the flight maneuver.

The hardware interface may be with respect to human-computer interface, such as a tablet computer, a laptop, or the like; the hardware interface for the human-computer interface may comprise audio, visual, keyboard, and tactile input by the human and output to the human. The hardware interface for the human-computer interface further allow human input into modules of flight information runtime computer system 105, such as into visualization module 110, such as to allow human selection of an aircraft in which a flight maneuver is to be performed, to allow human selection of the standard flight maneuver which is or was performed, to allow human interaction with imaging (such as to confirm that a flight instrument is imaged by a camera), to allow human review of output of the interpretation of the time-series of the flight data relative to the standard of the flight maneuver, such as for flight training purposes, and the like.

At block 1115, runtime generation module 1100 may obtain or receive a runtime neural network corresponding to the then-current runtime application being prepared. For example, if preparing runtime data capture module 1200, runtime generation module 1100 may obtain or receive runtime data capture neural network 815. For example, if preparing runtime data analysis module 1300, runtime generation module 1100 may obtain or receive runtime flight analysis neural network 820.

At block 1120, runtime generation module 1100 may configure the hardware interface to receive and output appropriate data structure(s) with respect to the hardware execution computer system environment.

At block 1125, runtime generation module 1100 may output the then-current runtime application.

At decision block 1130, runtime generation module 1100 may test the then-current runtime application, such as in an emulator of the runtime hardware, such as an emulator of flight information runtime computer system 105, and determine whether an error has occurred.

If affirmative or equivalent at decision block 1130, at decision block 1135, runtime generation module 1100 may determine whether the error was an error in the hardware I/O or in the neural network.

If in the hardware I/O or equivalent at decision block 1135, then at block 1140 runtime generation module 1100 may debug or have the hardware I/O debugged. Following block 1140, runtime generation module 1100 may return to block 1110.

If in the neural network or equivalent at decision block 1135, then at block 1145 runtime generation module 1100 may retrain the neural network, such as by calling data analysis neural training module 1000. Following block 1145, runtime generation module 1100 may return to block 1115.

If negative or equivalent at decision block 1130, runtime generation module 1100 may output the then-current runtime application, such as runtime data capture module 1200 or runtime data analysis module 1300. In embodiments, runtime generation module 1100 may output the runtime application with the neural network as a separate module, e.g. as one or more runtime data capture neural network 815 records or runtime flight analysis neural network 820 records, which may be updated or upgraded separately from the runtime application.

At block 1199, runtime generation module 1100 may conclude and/or return to a module and/or another process which may have called it.

Figure 12:
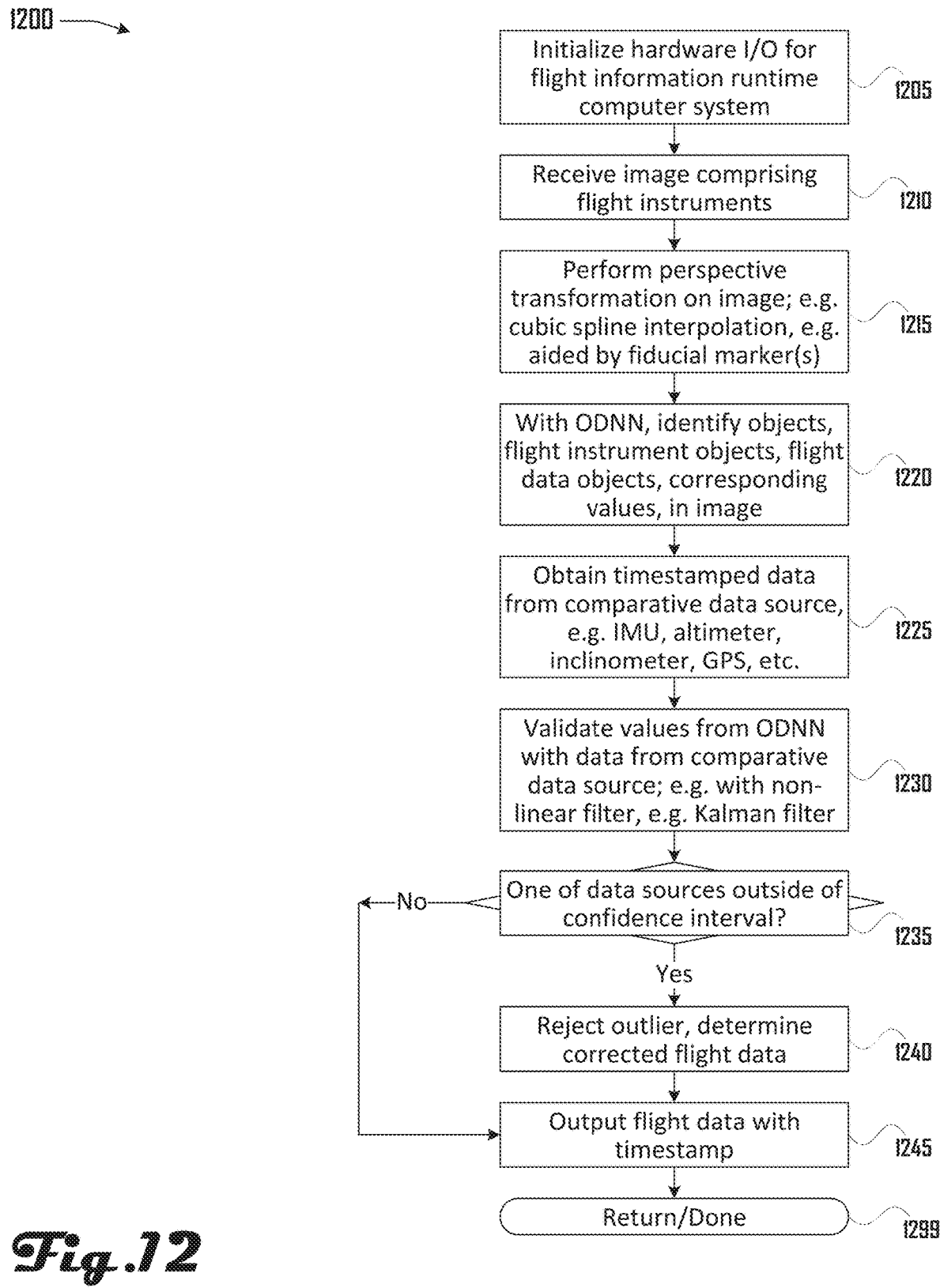
FIG. 12 is a flow diagram illustrating an example of a method performed by a runtime data capture module, incorporated with teachings of the present disclosure, according to some embodiments.

FIG. 12 is a flow diagram illustrating an example of a method performed by runtime data capture module 1200, incorporated with teachings of the present disclosure, according to some embodiments. Runtime data capture module 1200 may be performed by or with the assistance of a hardware accelerator, such as hardware acceleration module 210. This module may be performed by, for example, flight information runtime computer system 105 which, as noted, may be similar to flight information machine learning computer device 700.

At block 1205, runtime data capture module 1200 may initialize a hardware I/O for the flight information runtime computer system, connecting input and output for the computer system with modules of the computer system.

At block 1210, runtime data capture module 1200 may receive one or more images comprising flight instruments, such as an image of a cockpit of an aircraft captured by a camera of flight information runtime computer system 105. Examples of such an image are illustrated and discussed in relation to FIG. 2A and image 200. The image may comprise flight instruments. The image may comprise fiducial markers. The image may be stored in, for example, one or more log 830 records.

At block 1215, runtime data capture module 1200 may perform a perspective transformation of the received image(s) of block 1210. The perspective transformation may be, for example, an affine or bi-linear transformation. The perspective transformation may be aided by, for example, fiducial markers in the aircraft cockpit.

At block 1220, with an object detection neural network, such as runtime data capture neural network 815, runtime data capture module 1200 may identify objects, flight instrument objects, flight instrument data objects, and corresponding values in the image(s). One or more of such objects or values may be stored by runtime data capture module 1200 in, for example, one or more neural network flight data 805 records.

At block 1225, runtime data capture module 1200 may obtain timestamped data from a comparative data source, such as comparative data source 115, e.g. from an inertial measurement unit ("IMU"), an altimeter, a global positioning system ("GPS") receiver, or an inclinometer in the aircraft, for example, from one or more comparative data 825 records stored by runtime data capture module 1200 or a hardware interface thereof.

At block 1230, runtime data capture module 1200 may compare or validate values of neural network flight data 805 records of block 1220 relative to at least one of time adjacent neural network flight data 805 records and or to time corresponding comparative data 825 records of block 1225. The comparison or validation may use, for example, a filter, such as a Kalman filter. The comparison or validation may be visualized as illustrated in FIG. 5.

In decision block 1235, runtime data capture module 1200 may determine that one or more neural network flight data 805 records are outside of a confidence interval, error boundary, or the like.

If affirmative or equivalent at decision block 1235, at block 1240 runtime data capture module 1200 may reject the outlying neural network flight data 805 record(s) and determine corrected flight data, such as according to, for example, the filter and or to the comparative data 825 record.

At block 1299, runtime data capture module 1200 may conclude and or return to a module and/or another process which may have called it.

Figure 13:
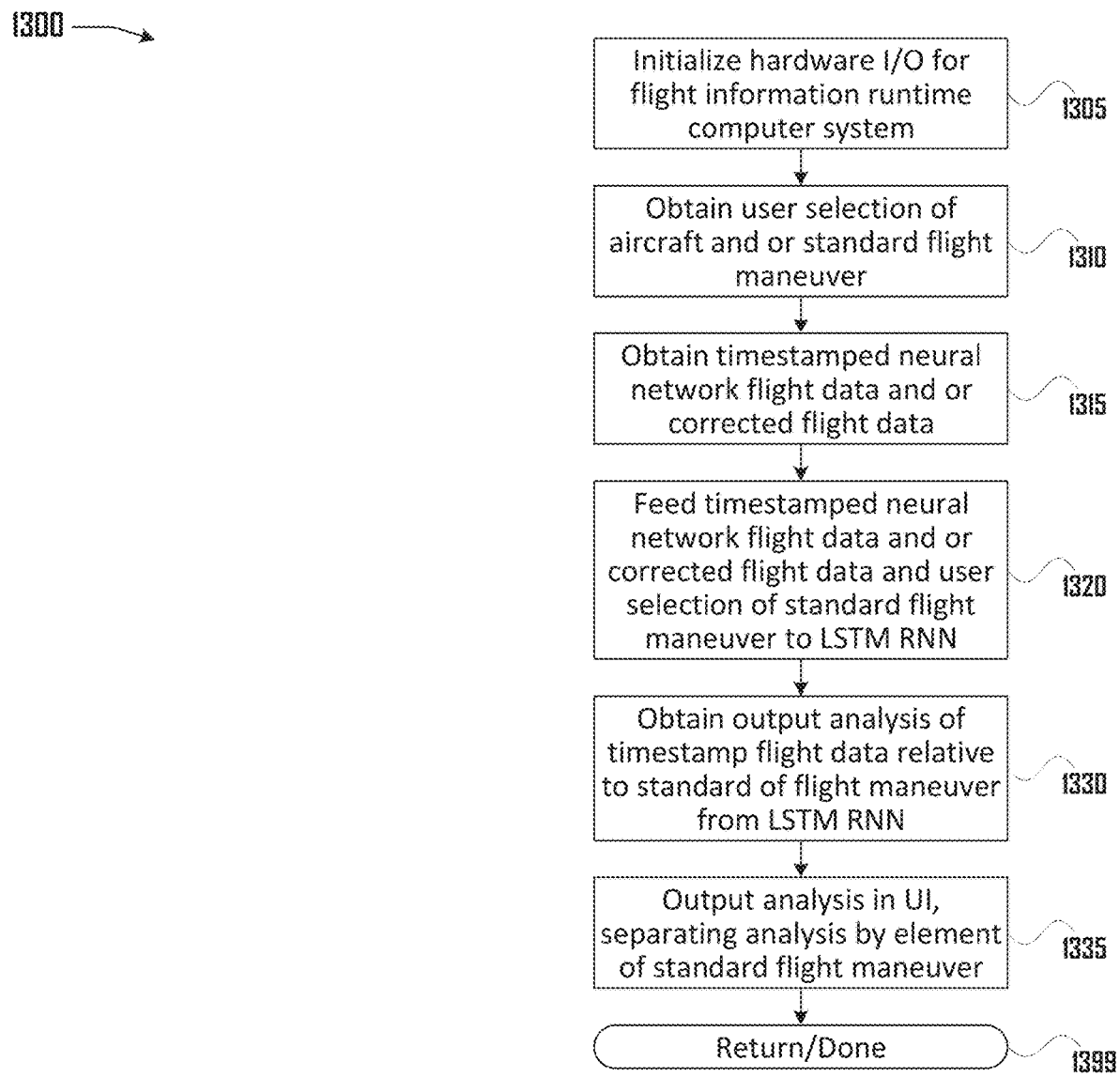
FIG. 13 is a flow diagram illustrating an example of a method performed by a runtime data analysis module, incorporated with teachings of the present disclosure, according to some embodiments.

FIG. 13 is a flow diagram illustrating an example of a method performed by runtime data analysis module 1300, incorporated with teachings of the present disclosure, according to some embodiments. Runtime data analysis module 1300 may be performed by or with the assistance of a hardware accelerator, such as hardware acceleration module 210. This module may be performed by, for example, flight information runtime computer system 105 which, as noted, may be similar to flight information machine learning computer device 700.

At block 1305, runtime data analysis module 1300 may initialize a hardware I/O for the flight information runtime computer system, connecting input and output for the computer system with modules of the computer system.

At block 1310, runtime data analysis module 1300 may obtain a user selection of an aircraft and or a standard flight maneuver to be performed in the aircraft.

At block 1315, runtime data analysis module 1300 may obtain timestamped neural network flight data and or corrected flight data from runtime data capture module 1200, e.g. from neural network flight data 805 records and or corrected flight data 845 records.

At block 1320, runtime data analysis module 1300 may feed or provide the timestamped neural network flight data and or corrected flight data to and or the user selection of the aircraft and or standard flight maneuver to a neural network runtime, such as runtime flight analysis neural network 820. The data, if not already formatted, may be formatted to conform to the requirements of the neural network, e.g. to be formatted as one or more vectors, tensors, or the like.

At block 1325, runtime data analysis module 1300 may obtain analysis from the runtime flight analysis neural network. The analysis may comprise, for example, labels, labeled images, and the like produced by runtime flight analysis neural network 820. The analysis may be stored as, for example, one or more flight maneuver analysis 850 records.

At block 1330, runtime data analysis module 1300 may output the analysis of block 1325 in a user interface, such as in a table computer, a laptop computer, a smartphone, a dedicated monitor, and the like.

At block 1399, runtime data analysis module 1300 may conclude and/or return to a module and/or another process which may have called it.

Figure 14:
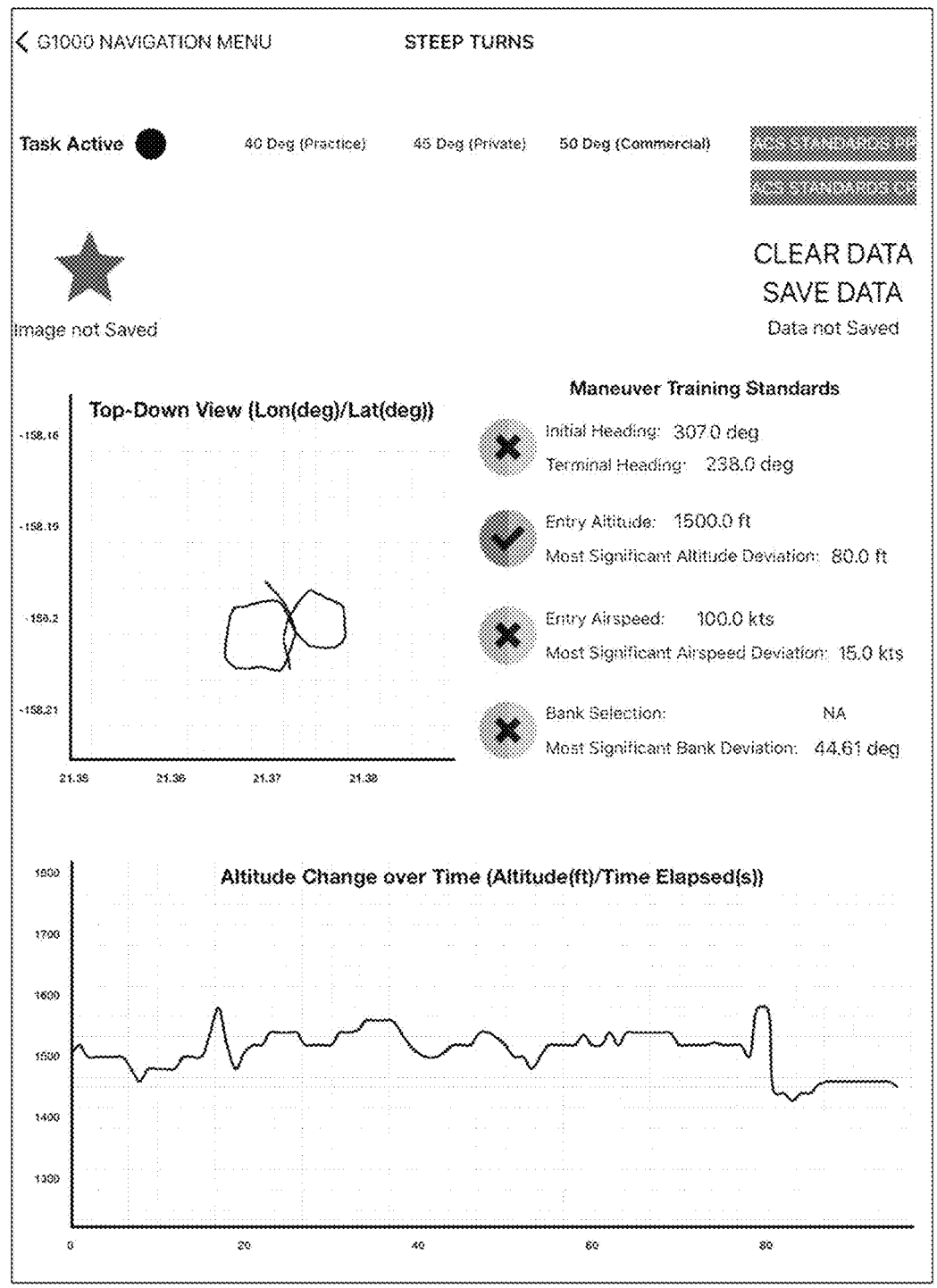
FIG. 14 illustrates output of a visualization module, incorporated with teachings of the present disclosure, according to some embodiments.

FIG. 14 illustrates output 1400 of visualization module 110, incorporated with teachings of the present disclosure, according to some embodiments. Visualization module 1400 may be performed by or with the assistance of a hardware accelerator, such as hardware acceleration module 210. This module may be performed by, for example, flight information runtime computer system 105 which, as noted, may be similar to flight information machine learning computer device 700.

Output 1400 illustrates that visualization module 100 may provide feedback regarding performance of a standard flight maneuver. In the illustrated example, the standard flight maneuver is a "steep turn". The feedback may comprise visualization of performance of the flight maneuver, e.g. using corrected flight data from runtime data capture module 1200, e.g. in the "Top-Down View" and in the "Altitude Change over Time". The feedback visualizations may be specific to the standard flight maneuver. The feedback may comprise labels associated with portions of the corrected flight data, relative to the standard flight maneuver, e.g. the portions of output 1400 saying, "Maneuver Training Standards", "Initial Heading", etc. These portions may be graphically linked to the visualization of performance of the flight maneuver, e.g. if "Initial heading" were graphically linked to a portion of "Top-Down View".

In this way, flight information machine learning computer device 700 and flight information runtime computer system 105 and modules thereof may be trained to and may acquire aircraft flight data through visual analysis of flight instruments with a data capture neural network, compare aircraft flight data to a standard of a flight maneuver with a data analysis neural network with minimal or no human input, output a visualization of aircraft flight data and or analysis of aircraft flight data, and or may acquire aircraft flight data, programmatically analyze aircraft flight data, and provide aircraft training to a prospective aircraft pilot, with minimal or reduced demand on a human trainer.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are examples of the foregoing:

Example 1. An apparatus to obtain a flight data through visual analysis of a flight instrument comprising: a computer processor and a memory; a runtime data capture module in the memory to obtain the flight data through visual analysis of the flight instrument, wherein to obtain flight data through visual analysis of the flight instrument, the computer processor is to execute the runtime data capture module to obtain an image of the flight instrument, identify the flight instrument in the image, determine the flight data from the flight instrument in the image and to thereby obtain the flight data through visual analysis of the flight instrument.

Example 2. The apparatus according to Example 1 or another Example or example herein, wherein the apparatus further comprises a camera, wherein the camera is to capture the image of the flight instrument.

Example 3. The apparatus according to at least one of Example 1 to Example 2 or another Example or example herein, wherein to determine the flight data from the flight instrument in the image, the runtime data capture module is to process the image with an object detection neural network to identify the flight instrument in the image and determine the flight data from the flight instrument in the image.

Example 4. The apparatus according to at least one of Example 1 to Example 3 or another Example or example herein, wherein to determine the flight data from the flight instrument in the image, the runtime data capture module is to perform a perspective transformation of the image and identify the flight instrument in the perspective transformation of the image.

Example 5. The apparatus according to at least one of Example 1 to Example 4 or another Example or example herein, wherein the flight instrument comprises a fiducial marker and wherein the runtime data capture module is to use the fiducial marker to aid the perspective transformation of the image.

Example 6. The apparatus according to at least one of Example 1 to Example 5 or another Example or example herein, wherein the perspective transformation comprises an affine or bi-linear transformation.

Example 7. The apparatus according to at least one of Example 1 to Example 6 or another Example or example herein, wherein the object detection neural network comprises a convolutional neural network.

Example 8. The apparatus according to at least one of Example 1 to Example 7 or another Example or example herein, wherein the convolutional neural network comprises an input, a backbone, a neck, and a head.

Example 9. The apparatus according to at least one of Example 1 to Example 8 or another Example or example herein, wherein the runtime data capture module is to size or reshape the image to match an input size of the object detection neural network.

Example 10. The apparatus according to at least one of Example 1 to Example 9 or another Example or example herein, wherein the image is further converted into a vector.

Example 11. The apparatus according to at least one of Example 1 to Example 10, wherein to process the image with the object detection neural network to identify the flight instrument in the image and determine the flight data from the flight instrument in the image, the runtime data capture module is to identify one or more objects in the image, is to identify the flight instrument as a flight instrument object among the one or more objects in the image, and is to identify the flight data as a flight data value object in the flight instrument object.

Example 12. The apparatus according to at least one of Example 1 to Example 11, wherein the runtime data capture module is further to validate the flight data relative to a comparative flight data obtained from a flight data sensor.

Example 13. The apparatus according to at least one of Example 1 to Example 12, wherein the apparatus comprises the flight data sensor, wherein the runtime data capture module is to obtain the comparative flight data from the flight data sensor.

Example 14. The apparatus according to at least one of Example 1 to Example 13, wherein the flight data sensor comprises at least one of an inertial measurement unit ("IMU"), an altimeter, a global positioning system ("GPS") receiver, or an inclinometer.

Example 15. The apparatus according to at least one of Example 1 to Example 14, wherein to validate the flight data relative to the comparative flight data, the runtime data capture module is to process a time-series of the flight data and a time-series of the comparative flight data in a Kalman filter and reject either a portion of the time-series of flight data or of the time-series of the comparative flight data which is outside of a confidence interval.

Example 16. The apparatus according to at least one of Example 1 to Example 15, further comprising a runtime data analysis module in the memory to perform an analysis of a time-series of the flight data.

Example 17. An apparatus to perform an analysis of a time-series of a flight data comprising: a computer processor and a memory; a runtime data analysis module in the memory to perform an analysis of the time-series of the flight data, wherein to perform the time-series analysis of the flight data, the computer processor is to execute the runtime data analysis module to compare the time-series of the flight data to a standard of a flight maneuver and output an interpretation of the time-series of the flight data relative to the standard of the flight maneuver.

Example 18. The apparatus according to Example 17, wherein the standard of the flight maneuver is a first standard of a first flight maneuver and wherein the runtime data analysis module is to compare the time-series of the flight data to a plurality of standard flight maneuvers, is to identify the time-series of the flight data as corresponding to the first standard of the first flight maneuver, and is to output an interpretation of the time-series of the flight data relative to the first standard of the first flight maneuver as the interpretation of the time-series of the flight data relative to the standard of the flight maneuver.

Example 19. The apparatus according to at least one of Example 17 to Example 18, wherein the interpretation of the time-series of the flight data relative to the standard of the flight maneuver comprises a comparison of the time-series of the flight data relative to at least one of a plurality of elements of the standard of the flight maneuver.

Example 20. The apparatus according to at least one of Example 17 to Example 19, wherein the comparison of the time-series of the flight data relative to at least one of the plurality of elements of the standard of the flight maneuver comprises an extent to which the time-series of the flight data conformed to the at least one of the plurality of elements of the standard of the flight maneuver.

Example 21. The apparatus according to at least one of Example 17 to Example 20, wherein the runtime data analysis module comprises a recurrent neural network.

Example 22. The apparatus according to at least one of Example 17 to Example 21, wherein the recurrent neural network comprises a long short-term memory architecture.

Example 23. The apparatus according to at least one of Example 17 to Example 22, wherein the long short-term memory architecture comprises a plurality of neurons, wherein the plurality of neurons comprise a cell, an input gate, an output gate, and a forget gate.

Example 24. The apparatus according to at least one of Example 17 to Example 23, wherein the long short-term memory architecture is to prevent a vanishing gradient.

Example 25. An apparatus to train a neural network to obtain a flight data through visual analysis of a flight instrument comprising: a computer processor and a memory; a neural training module in the memory to train the neural network to obtain the flight data through visual analysis of the flight instrument, wherein to train the neural network to obtain the flight data through visual analysis of the flight instrument, the neural training module is to provide the neural network with a plurality of images, wherein the plurality of images comprise a flight instrument, is to train the neural network to identify an object comprising the flight instrument in at least a portion of the plurality of images, and is to train the neural network to recognize the flight data in the object comprising the flight instrument.

Example 26. The apparatus according to Example 25, wherein the neural network comprises an object detection neural network.

Example 27. The apparatus according to one or more of Example 25 to Example 26, wherein the object detection neural network comprises a convolutional neural network.

Example 28. The apparatus according to one or more of Example 25 to Example 27, wherein the neural network is to be performed by a runtime data capture module, wherein the runtime data capture module is to perform the neural network to obtain the flight data through visual analysis of the flight instrument.

Example 29. An apparatus to train a neural network to perform a time-series analysis of flight data comprising: a computer processor and a memory; a neural training module in the memory, wherein to train the neural network to perform the time-series analysis of flight data, the neural training module is to provide the neural network with a time series flight data, is to train the neural network to compare the time series flight data to a standard of a flight maneuver, and is to train the neural network to output an interpretation of the time-series flight data relative to the standard of the flight maneuver.

Example 30. The apparatus according to Example 29 (Example 29), wherein the neural network comprises a recurrent neural network.

Example 31. The apparatus according to at least one of Example 29 to Example 30, wherein the recurrent neural network comprises a long short-term memory architecture.

Example 32. The apparatus according to at least one of Example 29 to Example 31, wherein the long short-term memory architecture comprises a plurality of neurons, wherein the plurality of neurons comprise a cell, an input gate, an output gate, and a forget gate.

Example 33. The apparatus according to at least one of Example 29 to Example 32, wherein the neural network is to be performed by a runtime data analysis module, wherein the runtime data analysis module is to perform the neural network to perform the time-series analysis of flight data.

Example 34. A method to obtain a flight data through visual analysis of a flight instrument comprising: with a computer processor and a memory, obtaining the flight data through visual analysis of the flight instrument, wherein obtaining flight data through visual analysis of the flight instrument comprises the computer processor and memory obtaining an image of the flight instrument, identifying the flight instrument in the image, determining the flight data from the flight instrument in the image and to thereby obtain the flight data through visual analysis of the flight instrument.

Example 35. The method according to Example 34 or another Example or example herein, further comprising a camera, wherein the computer processor and memory is to control the camera is to capture the image of the flight instrument.

Example 36. The method according to at least one of Example 34 to Example 35 or another Example or example herein, wherein determining the flight data from the flight instrument in the image comprises processing the image with an object detection neural network to identify the flight instrument in the image and to determine the flight data from the flight instrument in the image.

Example 37. The method according to at least one of Example 34 to Example 36 or another Example or example herein, wherein determining the flight data from the flight instrument in the image further comprises performing a perspective transformation of the image and identifying the flight instrument in the perspective transformation of the image.

Example 38. The method according to at least one of Example 34 to Example 37 or another Example or example herein, wherein the flight instrument comprises a fiducial marker and wherein performing the perspective transformation of the image further comprises using the fiducial marker to aid the perspective transformation of the image.

Example 39. The method according to at least one of Example 34 to Example 38 or another Example or example herein, wherein the perspective transformation comprises an affine or bi-linear transformation.

Example 40. The method according to at least one of Example 34 to Example 39 or another Example or example herein, wherein the object detection neural network comprises a convolutional neural network.

Example 41. The method according to at least one of Example 34 to Example 40 or another Example or example herein, wherein the convolutional neural network comprises an input, a backbone, a neck, and a head.

Example 42. The method according to at least one of Example 34 to Example 41 or another Example or example herein, further comprising sizing or reshaping the image to match an input size of the object detection neural network.

Example 43. The method according to at least one of Example 34 to Example 42 or another Example or example herein, further comprising converting the image into a vector.

Example 44. The method according to at least one of Example 34 to Example 43, wherein processing the image with the object detection neural network to identify the flight instrument in the image and determining the flight data from the flight instrument in the image, further comprises identifying one or more objects in the image, identifying the flight instrument as a flight instrument object among the one or more objects in the image, and identifying the flight data as a flight data value object in the flight instrument object.

Example 45. The method according to at least one of Example 34 to Example 44, further comprising obtaining a comparative data from a flight data sensor and validating the flight data relative to the comparative flight data obtained from the flight data sensor.

Example 46. The method according to at least one of Example 34 to Example 45, wherein the flight data sensor comprises at least one of an inertial measurement unit ("IMU"), an altimeter, a global positioning system ("GPS") receiver, or an inclinometer.

Example 47. The method according to at least one of Example 34 to Example 46, wherein validating the flight data relative to the comparative flight data comprises processing a time-series of the flight data and a time-series of the comparative flight data in a Kalman filter and rejecting either a portion of the time-series of flight data or of the time-series of the comparative flight data which is outside of a confidence interval.

Example 48. The method according to at least one of Example 34 to Example 47, further comprising, with the computer processor and memory, performing an analysis of a time-series of the flight data.

Example 49. A method to perform an analysis of a time-series of a flight data comprising: with a computer processor and a memory, performing an analysis of the time-series of the flight data, wherein performing the time-series analysis of the flight data comprises comparing the time-series of the flight data to a standard of a flight maneuver and preparing an interpretation of the time-series of the flight data relative to the standard of the flight maneuver.

Example 50. The method according to Example 49 (Example 49), wherein the standard of the flight maneuver is a first standard of a first flight maneuver and further comprising comparing the time-series of the flight data to a plurality of standard flight maneuvers, identifying the time-series of the flight data as corresponding to the first standard of the first flight maneuver, comparing the time-series of the flight data to the first standard of the first flight maneuver, and preparing an interpretation of the time-series of the flight data relative to the first standard of the first flight maneuver as the interpretation of the time-series of the flight data relative to the standard of the flight maneuver.

Example 51. The method according to at least one of Example 49 to Example 50, wherein the interpretation of the time-series of the flight data relative to the standard of the flight maneuver comprises a comparison of the time-series of the flight data relative to at least one of a plurality of elements of the standard of the flight maneuver.

Example 52. The method according to at least one of Example 49 to Example 51, wherein the comparison of the time-series of the flight data relative to at least one of the plurality of elements of the standard of the flight maneuver comprises determining an extent to which the time-series of the flight data conformed to the at least one of the plurality of elements of the standard of the flight maneuver.

Example 53. The method according to at least one of Example 49 to Example 52, wherein performing the analysis of the time-series of the flight data comprises performing the analysis of the time-series of the flight data with a recurrent neural network.

Example 54. The method according to at least one of Example 49 to Example 53, wherein the recurrent neural network comprises a long short-term memory architecture.

Example 55. The method according to at least one of Example 49 to Example 54, wherein the long short-term memory architecture comprises a plurality of neurons, wherein the plurality of neurons comprise a cell, an input gate, an output gate, and a forget gate.

Example 56. The method according to at least one of Example 49 to Example 55, wherein the long short-term memory architecture is to prevent a vanishing gradient.

Example 57. An method to train a neural network to obtain a flight data through visual analysis of a flight instrument comprising: with a computer processor and a memory, providing the neural network with a plurality of images, wherein the plurality of images comprise a flight instrument, training the neural network to identify an object comprising the flight instrument in at least a portion of the plurality of images, and training the neural network to recognize the flight data in the object comprising the flight instrument.

Example 58. The method according to Example 57, wherein the neural network comprises an object detection neural network.

Example 59. The method according to one or more of Example 57 to Example 58, wherein the object detection neural network comprises a convolutional neural network.

Example 60. The method according to one or more of Example 57 to Example 59, further comprising outputting the flight data recognized by the neural network.

Example 61. An method to train a neural network to perform a time-series analysis of flight data comprising: with a computer processor and a memory, providing the neural network with a time series flight data, training the neural network to compare the time series flight data to a standard of a flight maneuver, and outputting an interpretation of the time-series flight data relative to the standard of the flight maneuver.

Example 62. The method according to Example 61 (Example 60), wherein the neural network comprises a recurrent neural network.

Example 63. The method according to at least one of Example 61 to Example 62, wherein the recurrent neural network comprises a long short-term memory architecture.

Example 64. The method according to at least one of Example 61 to Example 63, wherein the long short-term memory architecture comprises a plurality of neurons, wherein the plurality of neurons comprise a cell, an input gate, an output gate, and a forget gate.

Example 65. The method according to at least one of Example 61 to Example 64, wherein training the neural network to compare the time-series flight data to the standard of the flight maneuver comprises training the neural network to develop a categorization of portions of the time-series flight according to the standard of the flight maneuver and wherein outputting the interpretation of the time-series flight data relative to the standard of the flight maneuver comprises outputting the categorizations of portions of the time-series flight according to the standard of the flight maneuver.

Example 66. A computer apparatus for obtaining a flight data through visual analysis of a flight instrument comprising: means to obtain the flight data through visual analysis of the flight instrument, wherein means to obtain flight data through visual analysis of the flight instrument comprises means to obtain an image of the flight instrument, means to identifying the flight instrument in the image with a neural network, means to determine the flight data from the flight instrument in the image with the neural network and to thereby obtain the flight data through visual analysis of the flight instrument.

Example 67. The apparatus according to Example 66 or another Example or example herein, further comprising a camera and means for the apparatus to control the camera to capture the image of the flight instrument.

Example 68. The apparatus according to at least one of Example 66 to Example 67 or another Example or example herein, wherein the neural network comprises an object detection neural network and wherein means to determine the flight data from the flight instrument in the image comprises means to process the image with the object detection neural network, means to identify the flight instrument in the image with the object detection neural network, and means to determine the flight data from the flight instrument in the image with the object detection neural network.

Example 69. The apparatus according to at least one of Example 66 to Example 68 or another Example or example herein, wherein means to determine the flight data from the flight instrument in the image further comprises means to perform a perspective transformation of the image and means to identify the flight instrument in the perspective transformation of the image.

Example 70. The apparatus according to at least one of Example 66 to Example 69 or another Example or example herein, wherein the flight instrument comprises a fiducial marker and wherein means to perform the perspective transformation of the image further comprises means to use the fiducial marker to aid the perspective transformation of the image.

Example 71. The apparatus according to at least one of Example 66 to Example 70 or another Example or example herein, wherein the perspective transformation comprises an affine or bi-linear transformation.

Example 72. The apparatus according to at least one of Example 66 to Example 71 or another Example or example herein, wherein the object detection neural network comprises a convolutional neural network.

Example 73. The apparatus according to at least one of Example 66 to Example 72 or another Example or example herein, wherein the convolutional neural network comprises means for an input, a backbone, a neck, and a head.

Example 74. The apparatus according to at least one of Example 66 to Example 73 or another Example or example herein, further comprising means to size or reshaping the image to match an input size of the object detection neural network.

Example 75. The apparatus according to at least one of Example 66 to Example 74 or another Example or example herein, further comprising means to convert the image into a vector.

Example 76. The apparatus according to at least one of Example 66 to Example 75, wherein means to process the image with the object detection neural network to identify the flight instrument in the image and means to determine the flight data from the flight instrument in the image, further comprises means to identify one or more objects in the image, identify the flight instrument as a flight instrument object among the one or more objects in the image, and identify the flight data as a flight data value object in the flight instrument object.

Example 77. The apparatus according to at least one of Example 66 to Example 76, further comprising means to obtain a comparative data from a flight data sensor and means to validate the flight data relative to the comparative flight data obtained from the flight data sensor.

Example 78. The apparatus according to at least one of Example 66 to Example 77, wherein the flight data sensor comprises at least one of an inertial measurement unit ("IMU"), an altimeter, a global positioning system ("GPS") receiver, or an inclinometer.

Example 79. The apparatus according to at least one of Example 66 to Example 78, wherein means to validate the flight data relative to the comparative flight data comprises means to process a time-series of the flight data and a time-series of the comparative flight data in a Kalman filter and reject either a portion of the time-series of flight data or of the time-series of the comparative flight data which is outside of a confidence interval.

Example 80. The apparatus according to at least one of Example 66 to Example 79, wherein the neural network is an object detection neural network and further comprising means to perform an analysis of a time-series of the flight data with a recurrent neural network.

Example 81. A computer apparatus to perform an analysis of a time-series of a flight data comprising: means to perform an analysis of the time-series of the flight data with a neural network, wherein means to perform the time-series analysis of the flight data with the neural network comprises means to compare the time-series of the flight data to a standard of a flight maneuver and means to prepare an interpretation of the time-series of the flight data relative to the standard of the flight maneuver.

Example 82. The apparatus according to Example 81, wherein the standard of the flight maneuver is a first standard of a first flight maneuver and further comprising means to compare the time-series of the flight data to a plurality of standard flight maneuvers, identify the time-series of the flight data as corresponding to the first standard of the first flight maneuver, compare the time-series of the flight data to the first standard of the first flight maneuver, and prepare an interpretation of the time-series of the flight data relative to the first standard of the first flight maneuver as the interpretation of the time-series of the flight data relative to the standard of the flight maneuver.

Example 83. The apparatus according to at least one of Example 81 to Example 82, wherein the interpretation of the time-series of the flight data relative to the standard of the flight maneuver comprises a comparison of the time-series of the flight data relative to at least one of a plurality of elements of the standard of the flight maneuver.

Example 84. The apparatus according to at least one of Example 81 to Example 83, wherein the comparison of the time-series of the flight data relative to at least one of the plurality of elements of the standard of the flight maneuver comprises means to determine an extent to which the time-series of the flight data conformed to the at least one of the plurality of elements of the standard of the flight maneuver.

Example 85. The apparatus according to at least one of Example 81 to Example 84, wherein the neural network comprises a recurrent neural network.

Example 86. The apparatus according to at least one of Example 81 to Example 85, wherein the recurrent neural network comprises a long short-term memory architecture.

Example 87. The apparatus according to at least one of Example 81 to Example 86, wherein the long short-term memory architecture comprises a plurality of neurons, wherein the plurality of neurons comprise a cell, an input gate, an output gate, and a forget gate.

Example 88. The apparatus according to at least one of Example 81 to Example 87, wherein the long short-term memory architecture is to prevent a vanishing gradient.

Example 89. A computer apparatus to train a neural network to obtain a flight data through visual analysis of a flight instrument comprising: means to provide the neural network with a plurality of images, wherein the plurality of images comprise a flight instrument, means to train the neural network to identify an object comprising the flight instrument in at least a portion of the plurality of images, and train the neural network to recognize the flight data in the object comprising the flight instrument.

Example 90. The apparatus according to Example 89, wherein the neural network comprises an object detection neural network.

Example 91. The apparatus according to one or more of Example 89 to Example 90, wherein the object detection neural network comprises a convolutional neural network.

Example 92. The apparatus according to one or more of Example 89 to Example 91, further comprising means to output the flight data recognized by the neural network.

Example 93. A computer apparatus to train a neural network to perform a time-series analysis of flight data comprising: means to provide the neural network with a time series flight data, train the neural network to compare the time series flight data to a standard of a flight maneuver, and output an interpretation of the time-series flight data relative to the standard of the flight maneuver.

Example 94. The apparatus according to Example 93, wherein the neural network comprises a recurrent neural network.

Example 95. The apparatus according to at least one of Example 93 to Example 94, wherein the recurrent neural network comprises a long short-term memory architecture.

Example 96. The apparatus according to at least one of Example 93 to Example 95, wherein the long short-term memory architecture comprises a plurality of neurons, wherein the plurality of neurons comprise a cell, an input gate, an output gate, and a forget gate.

Example 97. The apparatus according to at least one of Example 93 to Example 96, wherein means to train the neural network to compare the time-series flight data to the standard of the flight maneuver comprises means to train the neural network to develop a categorization of portions of the time-series flight according to the standard of the flight maneuver and wherein means to output the interpretation of the time-series flight data relative to the standard of the flight maneuver comprises means to output the categorizations of portions of the time-series flight according to the standard of the flight maneuver.

Example 98. One or more computer-readable media comprising instructions that cause a computer device, in response to execution of the instructions by a processor of the computer device, to: obtain a flight data through visual analysis of a flight instrument, wherein obtain flight data through visual analysis of the flight instrument comprises obtain an image of the flight instrument, identifying the flight instrument in the image with a neural network, determine the flight data from the flight instrument in the image with the neural network and to thereby obtain the flight data through visual analysis of the flight instrument.

Example 99. The computer-readable media according to Example 98 or another Example or example herein, wherein the instructions are further to cause the computer device to control a camera and to capture the image of the flight instrument with the camera.

Example 100. The computer-readable media according to at least one of Example 98 to Example 99 or another Example or example herein, wherein the neural network comprises an object detection neural network and wherein the instructions are further to cause the computer device to process the image with the object detection neural network, to identify the flight instrument in the image with the object detection neural network, and to determine the flight data from the flight instrument in the image with the object detection neural network.

Example 101. The computer-readable media according to at least one of Example 98 to Example 100 or another Example or example herein, wherein the instructions are further to cause the computer device to perform a perspective transformation of the image and to identify the flight instrument in the perspective transformation of the image.

Example 102. The computer-readable media according to at least one of Example 98 to Example 101 or another Example or example herein, wherein the flight instrument comprises a fiducial marker and wherein to perform the perspective transformation of the image further comprises to cause the computer device to use the fiducial marker to aid the perspective transformation of the image.

Example 103. The computer-readable media according to at least one of Example 98 to Example 102 or another Example or example herein, wherein the perspective transformation comprises an affine or bi-linear transformation.

Example 104. The computer-readable media according to at least one of Example 98 to Example 103 or another Example or example herein, wherein the object detection neural network comprises a convolutional neural network.

Example 105. The computer-readable media according to at least one of Example 98 to Example 104 or another Example or example herein, wherein the convolutional neural network comprises means for an input, a backbone, a neck, and a head.

Example 106. The computer-readable media according to at least one of Example 98 to Example 105 or another Example or example herein, wherein the instructions are further to cause the computer device to size or reshaping the image to match an input size of the object detection neural network.

Example 107. The computer-readable media according to at least one of Example 98 to Example 106 or another Example or example herein, wherein the instructions are further to cause the computer device to convert the image into a vector.

Example 108. The computer-readable media according to at least one of Example 98 to Example 107, wherein to process the image with the object detection neural network to identify the flight instrument in the image and means to determine the flight data from the flight instrument in the image, further comprises the instructions are further to cause the computer device to identify one or more objects in the image, identify the flight instrument as a flight instrument object among the one or more objects in the image, and identify the flight data as a flight data value object in the flight instrument object.

Example 109. The computer-readable media according to at least one of Example 98 to Example 108, wherein the instructions are further to cause the computer device to obtain a comparative data from a flight data sensor and to validate the flight data relative to the comparative flight data obtained from the flight data sensor.

Example 110. The computer-readable media according to at least one of Example 98 to Example 109, wherein the flight data sensor comprises at least one of an inertial measurement unit ("IMU"), an altimeter, a global positioning system ("GPS") receiver, or an inclinometer.

Example 111. The computer-readable media according to at least one of Example 98 to Example 110, wherein to validate the flight data relative to the comparative flight data comprises the instructions are to cause the computer device to process a time-series of the flight data and a time-series of the comparative flight data in a Kalman filter and reject either a portion of the time-series of flight data or of the time-series of the comparative flight data which is outside of a confidence interval.

Example 112. The computer-readable media according to at least one of Example 98 to Example 111, wherein the neural network is an object detection neural network and wherein the instructions are further to cause the computer device to perform an analysis of a time-series of the flight data with a recurrent neural network.

Example 113. One or more computer-readable media comprising instructions that cause a computer device, in response to execution of the instructions by a processor of the computer device, to: perform an analysis of a time-series of a flight data with a neural network, wherein to perform the time-series analysis of the flight data with the neural network comprises the instructions are to cause the computer device to compare the time-series of the flight data to a standard of a flight maneuver and to prepare an interpretation of the time-series of the flight data relative to the standard of the flight maneuver.

Example 114. The computer-readable media according to Example 113, wherein the standard of the flight maneuver is a first standard of a first flight maneuver and wherein the instructions are further to cause the computer device to compare the time-series of the flight data to a plurality of standard flight maneuvers, identify the time-series of the flight data as corresponding to the first standard of the first flight maneuver, compare the time-series of the flight data to the first standard of the first flight maneuver, and prepare an interpretation of the time-series of the flight data relative to the first standard of the first flight maneuver as the interpretation of the time-series of the flight data relative to the standard of the flight maneuver.

Example 115. The computer-readable media according to at least one of Example 113 to Example 114, wherein to prepare the interpretation of the time-series of the flight data relative to the standard of the flight maneuver comprises the instructions are further to cause the computer device to compare the time-series of the flight data to at least one of a plurality of elements of the standard of the flight maneuver.

Example 116. The computer-readable media according to at least one of Example 113 to Example 115, wherein to compare the time-series of the flight data to at least one of the plurality of elements of the standard of the flight maneuver comprises the instructions are further to cause the computer device to determine an extent to which the time-series of the flight data conformed to the at least one of the plurality of elements of the standard of the flight maneuver.

Example 117. The computer-readable media according to at least one of Example 113 to Example 116, wherein the neural network comprises a recurrent neural network.

Example 118. The computer-readable media according to at least one of Example 113 to Example 117, wherein the recurrent neural network comprises a long short-term memory architecture.

Example 119. The computer-readable media according to at least one of Example 113 to Example 118, wherein the long short-term memory architecture comprises a plurality of neurons, wherein the plurality of neurons comprise a cell, an input gate, an output gate, and a forget gate.

Example 120. The computer-readable media according to at least one of Example 113 to Example 119, wherein the long short-term memory architecture is to prevent a vanishing gradient.

Example 121. One or more computer-readable media comprising instructions that cause a computer device, in response to execution of the instructions by a processor of the computer device, to train a neural network to obtain a flight data through visual analysis of a flight instrument, wherein to train the neural network to obtain the flight data through visual analysis of the flight instrument comprises the instructions are further to cause the computer device to provide the neural network with a plurality of images, wherein the plurality of images comprise a flight instrument, to train the neural network to identify an object comprising the flight instrument in at least a portion of the plurality of images, and to train the neural network to recognize the flight data in the object comprising the flight instrument.

Example 122. The computer-readable media according to Example 121, wherein the neural network comprises an object detection neural network.

Example 123. The computer-readable media according to one or more of Example 121 to Example 122, wherein the object detection neural network comprises a convolutional neural network.

Example 124. The computer-readable media according to one or more of Example 121 to Example 123, wherein the instructions are further to cause the computer device to output the flight data recognized by the neural network.

Example 125. One or more computer-readable media comprising instructions that cause a computer device, in response to execution of the instructions by a processor of the computer device, to: train a neural network to perform a time-series analysis of flight data, wherein to train the neural network to perform the time-series analysis of flight data comprises to cause the computer device to provide the neural network with a time series flight data, train the neural network to compare the time series flight data to a standard of a flight maneuver, and to output an interpretation of the time-series flight data relative to the standard of the flight maneuver.

Example 126. The computer-readable media according to Example 125, wherein the neural network comprises a recurrent neural network.

Example 127. The computer-readable media according to at least one of Example 125 to Example 126, wherein the recurrent neural network comprises a long short-term memory architecture.

Example 128. The computer-readable media according to at least one of Example 125 to Example 127, wherein the long short-term memory architecture comprises a plurality of neurons, wherein the plurality of neurons comprise a cell, an input gate, an output gate, and a forget gate.

Example 129. The computer-readable media according to at least one of Example 125 to Example 128, wherein to train the neural network to compare the time-series flight data to the standard of the flight maneuver comprises the instructions are further to cause the computer device to train the neural network to develop a categorization of portions of the time-series flight according to the standard of the flight maneuver and to output the interpretation of the time-series flight data relative to the standard of the flight maneuver comprises the instructions are further to cause the computer device to output the categorizations of portions of the time-series flight according to the standard of the flight maneuver.

The invention claimed is:

1. An apparatus to obtain flight data for pilot flight maneuver training through visual analysis of a flight instrument comprising:
 a computer-vision-implementing camera with sightlines to a part of an instrument panel that includes the flight instrument in the aircraft cockpit and having an onboard real time flight information machine learning chipset, a computer processor a memory, and a runtime data capture module in the memory,
 wherein to obtain the flight data for the pilot flight maneuver training through visual analysis of the flight instrument, the computer-vision-implementing camera processor is to execute the runtime data capture module to obtain an image of the flight instrument, to process the image with an object detection neural network to identify the flight instrument in the image and perform a perspective transformation of the image using one or more fiducial markers in the image, to determine the flight data from the flight instrument in the image and to thereby obtain the flight data through real time device-implemented visual analysis of the flight instrument without an electrical signal from the flight instrument and without an electrical signal from any flight data recorder, wherein the flight data are obtained from real flight environment, the flight data are used for training the object detection neural network comprising time-series data of real flight environment comprising real flight instrument, the flight data comprises of standard flight maneuver data, obtained from real flight environment, to be compared with the flight data for the pilot flight maneuver training.

2. The apparatus according to claim 1, wherein to process the image with the object detection neural network to identify the flight instrument in the image and determine the flight data from the flight instrument in the image, the runtime data capture module is to identify one or more objects in the image, is to identify the flight instrument as a flight instrument object among the one or more objects in the image, and is to identify the flight data as a flight data value object in the flight instrument object.

3. The apparatus according to claim 1, wherein the runtime data capture module is further to validate the flight data relative to a comparative flight data obtained in real time from a flight data sensor.

4. The apparatus according to claim 1, further comprising a runtime data analysis module in the memory to perform an analysis of a time-series of the flight data, wherein the runtime data analysis module comprises a recurrent neural network to perform the analysis of the time-series of the flight data.

5. The apparatus according to claim 4, wherein to perform the time-series analysis of the flight data, the computer processor is to execute the runtime data analysis module and the recurrent neural network to compare the time-series of the flight data to a standard of a flight maneuver and output an interpretation of the time-series of the flight data relative to the standard of the flight maneuver.

6. A method comprising:
obtaining a flight data for pilot flight maneuver training through visual analysis of a flight instrument with a computer-vision-implementing camera with sightlines to a part of an instrument panel that includes the flight instrument in the aircraft cockpit and having an onboard real time flight information machine learning chipset, a computer processor and a memory, obtaining the flight data through visual analysis of the flight instrument, wherein obtaining flight data for flight training through visual analysis of the flight instrument comprises the computer processor and memory obtaining an image of the flight instrument, identifying the flight instrument in the image, determining the flight data from the flight instrument in the image and to thereby obtain the flight data through visual analysis of the flight instrument,
wherein determining the flight data from the flight instrument in the image comprises processing the image with an object detection neural network to identify the flight instrument in the image and performing a perspective transformation of the image using one or more fiducial markers in the image, and to determine the flight data from the flight instrument in the image without an electrical signal from the flight instrument and without an electrical signal from any flight data recorder,
wherein the flight data are obtained from real flight environment, the flight data are used for training the object detection neural network comprising time-series data of real flight environment comprising real flight instrument, the flight data comprises of standard flight maneuver data, obtained from real flight environment, to be compared with the flight data for the pilot flight maneuver training.

7. The method according to claim 6, wherein processing the image with the object detection neural network to identify the flight instrument in the image and determining the flight data from the flight instrument in the image, further comprises identifying one or more objects in the image, identifying the flight instrument as a flight instrument object among the one or more objects in the image, and identifying the flight data as a flight data value object in the flight instrument object.

8. The method according to claim 6, further comprising obtaining a comparative data from a flight data sensor and validating the flight data relative to the comparative flight data obtained in real time from the flight data sensor, wherein validating the flight data relative to the comparative flight data comprises processing a time-series of the flight data and a time-series of the comparative flight data in a Kalman filter and rejecting either a portion of the time-series of flight data or of the time-series of the comparative flight data which is outside of a confidence interval.

9. The method according to claim 6, further comprising, performing an analysis of a time-series of the flight data, wherein performing the analysis of the time-series of the flight data comprises performing the analysis of the time-series of the flight data with a recurrent neural network.

10. The method according to claim 9, wherein performing the time-series analysis of the flight data comprises comparing the time-series of the flight data to a standard of a flight maneuver and preparing an interpretation of the time-series of the flight data relative to the standard of the flight maneuver.

11. The method according to claim 10, wherein the interpretation of the time-series of the flight data relative to the standard of the flight maneuver comprises a comparison of the time-series of the flight data relative to at least one of a plurality of elements of the standard of the flight maneuver.

12. A computer apparatus for obtaining a flight data for pilot flight maneuver training through visual analysis of a flight instrument comprising:
means to obtain an image of the flight instrument through a computer-vision-implementing camera with sightlines to a part of an instrument panel that includes the flight instrument in the aircraft cockpit and having an onboard real time flight information machine learning chipset, means to identifying the flight instrument in the image with a neural network,
means to performing a perspective transformation of the image using one or more fiducial markers,
means to determine the flight data from the flight instrument in the image with a neural network and to thereby obtain the flight data through visual analysis of the flight instrument, wherein the flight data is for the pilot flight maneuver training, and the computer-vision camera processes the image with the neural network to identify the flight instrument in the image where the perspective transformation is perform on, to determine the flight data from the flight instrument in the image and to thereby obtain the flight data through real time device-implemented visual analysis of the flight instrument without an electrical signal from the flight instrument and without an electrical signal from any flight data recorder, wherein the flight data are obtained from real flight environment, the flight data are used for training the object detection neural network comprising time-series data of real flight environment comprising real flight instrument, the flight data comprises of standard flight maneuver, data obtained from real flight environment, to be compared with the flight data for the pilot flight maneuver training.

13. The apparatus according to claim 12, further comprising a camera and means for the apparatus to control the camera to capture the image of the flight instrument.

14. The apparatus according to claim 12, wherein the neural network comprises an object detection neural network and wherein means to determine the flight data from the flight instrument in the image comprises means to process the image with the object detection neural network, means to identify the flight instrument in the image with the object detection neural network, and means to determine the flight data from the flight instrument in the image with the object detection neural network.

15. The apparatus according to claim 12, further comprising means to obtain a comparative data from a flight data sensor and means to validate the flight data relative to the comparative flight data obtained in real time from the flight data sensor.

16. The apparatus according to claim 12, wherein the neural network is an object detection neural network and further comprising means to perform an analysis of a time-series of the flight data with a recurrent neural network.

17. The apparatus according to claim 16, wherein means to perform the time-series analysis of the flight data with the neural network comprises means to compare the time-series of the flight data to a standard of a flight maneuver and means to prepare an interpretation of the time-series of the flight data relative to the standard of the flight maneuver.

18. The apparatus according to claim 16, wherein the standard of the flight maneuver is a first standard of a first flight maneuver and further comprising means to compare the time-series of the flight data to a plurality of standard flight maneuvers, identify the time-series of the flight data as corresponding to the first standard of the first flight maneuver, compare the time-series of the flight data to the first standard of the first flight maneuver, and prepare an interpretation of the time-series of the flight data relative to the first standard of the first flight maneuver as the interpretation of the time-series of the flight data relative to the standard of the flight maneuver.

19. The method according to claim 6, including labeling the flight data using a long short-term memory architecture recurrent neural network ("LSTM RNN") that has been trained relative to one or more standard flight maneuver training data records.

* * * * *